US012782608B2

(12) United States Patent
Angel et al.

(10) Patent No.: US 12,782,608 B2
(45) Date of Patent: Nov. 3, 2026

(54) APPARATUS AND METHOD FOR THE MANUFACTURE OF LARGE GLASS LENS ARRAYS

(71) Applicant: Arizona Board of Regents on Behalf of the University of Arizona, Tucson, AZ (US)

(72) Inventors: James Roger P. Angel, Tucson, AZ (US); Nicholas J. Didato, Tucson, AZ (US); Ryker Eads, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 474 days.

(21) Appl. No.: 17/763,355

(22) PCT Filed: Sep. 24, 2020

(86) PCT No.: PCT/US2020/052522
§ 371 (c)(1),
(2) Date: Mar. 24, 2022

(87) PCT Pub. No.: WO2021/062010
PCT Pub. Date: Apr. 1, 2021

(65) Prior Publication Data

US 2022/0342123 A1 Oct. 27, 2022

Related U.S. Application Data

(60) Provisional application No. 62/905,824, filed on Sep. 25, 2019.

(51) Int. Cl.
*G02B 3/00* (2006.01)
*C03B 13/08* (2006.01)
(Continued)

(52) U.S. Cl.
CPC ............ *G02B 3/0031* (2013.01); *C03B 13/08* (2013.01); *C03B 18/14* (2013.01); *C03C 19/00* (2013.01); *C03C 27/10* (2013.01); *G02B 3/0056* (2013.01)

(58) Field of Classification Search
None
See application file for complete search history.

(56) References Cited

U.S. PATENT DOCUMENTS 2,126,351 A 8/1938 Sharp
3,345,149 A * 10/1967 Michalik ................ C03B 18/08 65/93

(Continued)

FOREIGN PATENT DOCUMENTS

WO 2018/052833 A1 3/2018

*Primary Examiner* — Abbas Rashid
*Assistant Examiner* — Caroline Beha
(74) *Attorney, Agent, or Firm* — Venable LLP; Ryan T. Ward

(57) ABSTRACT

A method of manufacturing large lens arrays from glass includes heating glass to take a form of a glass sheet of viscous liquid glass floating on liquid metal. Large lens arrays are made by the method and devices and systems are used for making the large lens arrays. The glass sheet has a lower surface in contact with the liquid metal and an upper surface on an opposite side of the glass sheet away from the liquid metal. The method applies a gas flow on the upper surface of the glass sheet to cause the upper surface of the glass sheet to form a pattern of convex lenses in response to local variations in a pressure profile of the gas flow; and cooling the glass sheet to solidify into a rigid, patterned glass sheet.

10 Claims, 17 Drawing Sheets

(51) Int. Cl.

| | |
|---|---|
| ***C03B 18/14*** | (2006.01) |
| ***C03C 19/00*** | (2006.01) |
| ***C03C 27/10*** | (2006.01) |

(56) References Cited

U.S. PATENT DOCUMENTS

| | | | | |
|---|---|---|---|---|
| 3,506,422 | A * | 4/1970 | Walters | C03B 18/02<br>65/32.5 |
| 4,074,994 | A * | 2/1978 | Glikman | C03B 31/00<br>65/44 |
| 6,472,031 | B1 | 10/2002 | Daecher et al. | |
| 6,705,742 | B1 | 3/2004 | Patterson et al. | |
| 6,791,696 | B1 | 9/2004 | Fantone et al. | |
| 8,524,167 | B2 | 9/2013 | Regits et al. | |
| 9,156,720 | B2 | 10/2015 | Krasnov et al. | |
| 9,486,074 | B2 | 11/2016 | Garg et al. | |
| 9,944,555 | B2 * | 4/2018 | Shirai | C03C 21/002 |
| 2006/0219653 | A1 * | 10/2006 | Quenzer | C03B 19/02<br>216/2 |
| 2009/0038343 | A1 * | 2/2009 | Gibson | H01L 31/0547<br>65/100 |
| 2010/0252128 | A1 | 10/2010 | Gong et al. | |
| 2013/0182333 | A1 | 7/2013 | Meitl et al. | |
| 2014/0016206 | A1 * | 1/2014 | Hettler | C03B 23/04<br>65/102 |
| 2014/0261627 | A1 | 9/2014 | Meitl et al. | |
| 2021/0292221 | A1 * | 9/2021 | Fournel | C03B 35/18 |

* cited by examiner

APPARATUS AND METHOD FOR THE MANUFACTURE OF LARGE GLASS LENS ARRAYS

CROSS-REFERENCE TO RELATED APPLICATIONS

This application is a U.S. National Stage Application of PCT/US2020/052522, filed Sep. 24, 2020, which claims priority benefit to U.S. Provisional Patent Application No. 62/905,824, filed on Sep. 25, 2019, the entire contents of which are incorporated herein by reference. All references cited anywhere in this specification, including the Background and Detailed Description sections, are incorporated by reference as if each had been individually incorporated.

BACKGROUND

1. Technical Field

The field of currently claimed embodiments of this invention relates to large lens arrays made of glass and the manufacture thereof.

2. Discussion of Related Art

Currently, two-dimensional arrays of glass lenses are made in one piece in small sizes (10 mm-100 mm) by molding pieces of hot softened glass. There is room for improvement, especially for applications where large (meter-scale) sheets of many hundreds of lenses, low cost, high specularity and sharp cusps between individual lenses, and high-volume production are important. One such application is in the manufacture of large, all-glass lens arrays for solar photovoltaic modules. Arrays of mirrors or lenses are used to make high-efficiency solar concentrating photovoltaic ("CPV") modules, in which sunlight is divided into small areas, each focused onto a very small multijunction photovoltaic cell. By focusing, CPV modules convert direct sunlight into electricity more efficiently than do the silicon PV modules widely used today, but unlike PV modules, make no use of indirect light from the sky and clouds. As a result, the gain in overall efficiency is reduced.

Recent research has been directed at a new type of hybrid PV module using both silicon PV cells and multijunction cells, with the potential for doubling the conversion efficiency of total available solar energy into electrical energy e.g. Meitd et al, US 2014/0261627. Previously PV modules have used silicon or other single-junction PV cells behind parallel-sided flat glass entrance windows with no focusing or concentration. In the new concept, the flat glass window of a PV module is replaced with a lens array and is turned to the sun so that direct sunlight is focused as many individual points on the silicon cells, now set back from the glass. At these points are attached very small multijunction PV cells with double the conversion efficiency of silicon. At the same time, the diffuse light from the sky and clouds is transmitted through the lens array and is thus still converted to electricity by the silicon cells.

In the past, large two-dimensional lens arrays used with multijunction cells have been made by molding plastic or silicone onto sheets of flat glass, e.g. Meitl et al, 2013, US 2013/0182333 A1. But such manufacture is complex and expensive, and such lens arrays have not yielded the highest efficiency modules because of the optical limitations of plastic: high dispersion that causes chromatic aberration, high expansion that causes thermal defocusing, and absorption in near infrared wavelengths of sunlight, reduces the efficiency of sunlight concentration. There is thus room for improvement—a large, all-glass lens array would be much preferable to avoid the above optical limitations, to provide chemical and optical stability over decades of operation, and potentially lower cost, a critical factor for viable solar technologies.

In another application, two-dimensional arrays of lenses are used in many forms of energy-efficient lighting, in which light from an array of LEDs is directed to the region to be illuminated by a corresponding array of lenses. Here again, the cost of making such arrays from glass, the preferred material, is high, and poor definition of the lens boundaries leads to loss of light. There is thus room for improvement to reduce cost and increase performance.

The two methods used currently to make glass lenses with accurate smooth, specular curved surfaces are 1) grinding and polishing, which cannot be used to make continuous glass arrays, and 2) hot pressing of softened glass into polished molds, where the smooth, specular shaped surfaces of the mold with the inverse shape of the array to be formed is replicated on the glass. However, present methods allow for only small arrays to be made this way.

Difficulties remain if a large, patterned mold were to be used to emboss a large two-dimensional array of many adjacent convex focusing lenses in one pressing. In order to cleanly separate the individual lenses formed, the mold's large quilted surface requires sharply defined raised cusp boundaries; these and the mold's specular finish would need to be maintained over extended production runs. Gas entrapment in the crown of each domed segment above a lens could be problematic if a large sheet of glass is to be embossed as a flat sheet of many lenses. As a result of these difficulties, large glass lens arrays may not be mass produced at low cost by present state of the art.

Therefore, there remains a need for improved large flat lens arrays made of glass and methods of manufacture.

SUMMARY

A method of manufacturing large lens arrays from glass according to an embodiment of the current invention includes heating glass to take a form of a glass sheet of viscous liquid glass floating on liquid metal. The glass sheet has a lower surface in contact with the liquid metal and an upper surface on an opposite side of the glass sheet away from the liquid metal. The method includes applying a gas flow on the upper surface of the glass sheet to cause the upper surface of the glass sheet to form a pattern of convex lenses in response to local variations in a pressure profile of the gas flow; and cooling the glass sheet to solidify into a rigid, patterned glass sheet. Both the lower and upper surfaces of the patterned glass sheet are locally smooth to have a specular finish, and the upper surface of the patterned glass sheet is formed into the pattern of convex lenses.

A large glass lens array according to an embodiment of the current invention is produced according to the method above.

A patterned glass sheet according to another embodiment of the current invention includes a monolithic array of refractive lenses defined by a surface of the patterned glass sheet. Upper and lower surfaces of the patterned glass sheet are both locally smooth to have a specular finish, and the patterned glass sheet has dimensions of at least 10 cm by 10 cm.

An apparatus for producing patterned glass sheets according to another embodiment of the current invention includes a plurality of entrance plenums each defining an entrance aperture; a plurality of exit plenums arranged in a pattern relative to the plurality of entrance plenums, each exit plenum of the plurality of exit plenums defining an exit aperture; and a continuous forming surface between adjacent entrance and exit apertures. The apparatus is structure to be arranged proximate, without contacting, a surface of a hot, viscous sheet of glass floating on liquid metal while in use.

A system for the manufacture of patterned glass sheets according to another embodiment of the current invention includes a furnace; a flat vessel disposed within the furnace; and an apparatus for producing patterned glass sheets disposed within the furnace and proximate the flat vessel. The flat vessel is structured to contain a liquid metal bath with a hot, viscous sheet of glass floating thereon. The apparatus for producing patterned glass sheets includes a plurality of entrance plenums each defining an entrance aperture; a plurality of exit plenums arranged in a pattern relative to the plurality of entrance plenums, each exit plenum of the plurality of exit plenums defining an exit aperture; and a continuous forming surface between adjacent entrance and exit apertures. The apparatus is structured to be arranged proximate, without contacting, a surface of the hot, viscous sheet of glass floating on the liquid metal while in use.

A method of manufacturing flat or cylindrical molds to emboss arrays of adjacent plano-convex spherical lenses that have minimal losses of incident light at lens boundaries according to another embodiment of the current invention includes machining flat or cylindrical mold material to form a mold of intersecting cups in an array configuration, the intersecting cups being portions of at least a corresponding sphere up to a boundary of intersection; and grinding and then polishing the configured cups with a hard spherical lap. The hard spherical lap is sufficiently hard so that the intersecting cups are sharp at boundaries of intersection.

A method of manufacturing a two-dimensional glass lens array according to another embodiment of the current invention includes embossing float glass to make sheets that have adjacent convex cylindrical lenses arrayed on one side and flat on the other side of the sheets; and bonding the flat sides of first and second embossed sheets together with optically transparent adhesive, oriented with the cylindrical lenses on the second sheet at right angles to those on the first sheet. The two-dimensional glass lens array are structured so that collimated light entering through the first sheet is focused toward line foci, and on exiting the second sheet is further focused to discrete foci.

A method of manufacturing a two-dimensional glass lens array according to another embodiment of the current invention includes providing float glass; and roll-forming the float glass between a first roller and a second roller, the first roller configured to emboss the first surface of the glass with a pattern of cylindrical lenses arrayed in a given first orientation and the second roller configured to emboss the second surface of the glass with cylindrical lenses oriented in a second orientation at right angles to the first direction. The two-dimensional glass lens array is structured such that collimated light entering the first surface is focused toward line foci, and on exiting the second surface is further focused to discrete point foci. Another embodiment of the current invention is directed to the two-dimensional glass lens array produced according to this method.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention.

DETAILED DESCRIPTION

Figure 1:
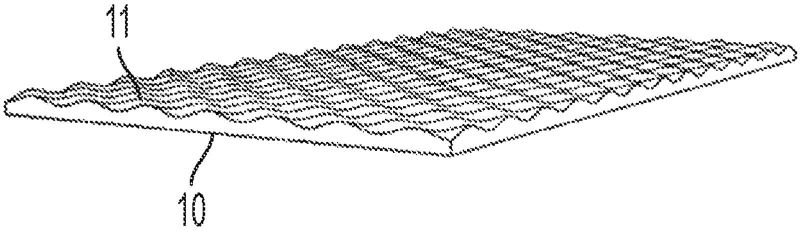
FIG. 1 is a perspective view of a decorative glass sheet according to an embodiment of the present invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "light" as used herein is intended to have a broad definition so as to include electromagnetic radiation in both visible and non-visible regions of the electromagnetic spectrum. For example, infrared and ultraviolet light are intended to be included within the broad meaning of the term light in addition to visible light.

The term "locally smooth specular finish" is intended to mean an optical surface which is sufficiently non-scattering and non-diffractive for light of interest such that the optical properties of the surface can be treated using ray tracing techniques, and scattering losses of transmitted light are substantially negligible.

The term "substantially" as used herein means to within tolerances that are suitable for the particular application and/or within tolerances that are standard in the field.

The term "nitrogen gas" as used herein is intended to mean generally any non-oxidizing or reducing gas mixture (for example including some hydrogen) as used in float glass manufacture.

The term "silicon" is intended to mean generally any single junction semiconductor used in PV cells.

An embodiment of the current invention is a method of manufacture of patterned glass sheets or lens arrays suitable for production in very high volume at low cost. The shaping method yields a specular finish on both sides, with one side finished accurately to a specific shape or pattern and the other flat. The very simple, efficient and inexpensive means of focusing with the shaped glass lens arrays according to some embodiments of this invention has the potential to unleash the full potential of multi-junction cells to be combined with silicon PV modules to greatly increase PV total module energy output.

At the present time, two distinct and different methods are used in huge volume to shape glass with specular finish at low cost. Both methods rely on shaping softened or liquid glass by fluid pressure, with surface tension yielding the desired smooth, specular finish. The first method is floating liquid glass on liquid tin. This method is used to form glass sheets flat on both sides, used for architectural windows and solar module flat windows. The second method is glass blowing, where gas pressure is used to form softened glass into curved shapes, for example to make bottles. However, neither of these processes alone is capable of forming patterned glass sheets.

An embodiment of the current invention provides a method to form a patterned glass sheet by utilizing concepts similar to the presently distinct and separate float glass and blown glass methods. In an embodiment, viscous liquid glass floating on liquid metal is at the same time shaped by applying spatially varying gas pressure to the upper surface. Regions of higher pressure are used to locally depress the glass while at the same time local regions of lower pressure are created to locally raise the glass. In an equilibrium state, the gas pressure acting on the glass surface is in detailed balance with the sum of the two pressures generated by the patterned profile in the glass, which are 1) the hydrostatic pressure from height variations, and 2) the surface tension pressure due to surface curvature. As a result of the liquid glass being in static equilibrium, its pressure is constant at any given level beneath the surface, and the boundary with the tin is flat. Once this equilibrium state is reached or approached, the glass is cooled and the shape is preserved in a solid glass sheet, with the tin-side flat, and the opposite side shaped. By this method, a glass sheet may be produced in one step which is flat and specular on its lower side and patterned and specular on the other, upper side, all with no contact with solid mold material.

In an embodiment of this invention, local variations of pressure across the glass surface are created within an enclosed volume above the glass surface by a plurality of apertures. Gas entering the enclosed volume through these apertures at higher pressure locally depresses the glass, while gas exiting at a plurality of other apertures at lower pressure locally raises the glass. In some embodiments of the invention, the entrance and exit apertures may be arranged in a repeating pattern with a continuous forming surface therebetween, the incoming and outgoing flow rates are balanced, and the average gas pressure remains unchanged. In this way, the pattern may be formed in large sheets of glass with no large-scale build-up across the glass of increasing or decreasing gas pressure that would change the average glass thickness. Similarly, the average thickness of the glass remains unchanged, with the volume of depressed glass equaling that of raised glass. In this way there is no global net flow of glass, and very large sheets may be formed if desired.

In different embodiments of the invention, the different desired shapes of the upper surface of the glass are created by different shapes of the forming surface that channels the gas flow between apertures, different geometries of the entry and exit apertures and different pressures used to create flow in and out of these apertures. In addition, time-dependent changes in jet geometry, temperature and pressure may be made as the glass takes shape during the forming process. For example, in some embodiments the forming assembly may be lowered to be closer to the glass surface as the pattern is being formed to give better control of details, still without making any contact between the forming surface and the glass.

In one embodiment, the invention is used to make glass sheets in the form of arrays of adjacent identical plano-convex lenses. The lens patterns may for example be square or hexagonal, with four or six linear boundaries around each lens. To sharpen the boundary lines between the lenses, the entrance apertures may take the form of narrow linear, high-pressure gas jets set close to the glass. Gas entering at high pressure depresses the glass in a narrow region immediately beneath to form the sharply concave boundary regions, where the narrow region of high gas pressure balances the high local force of surface tension. The gas entering in the region of the perimeter jets is then channeled radially inward by the forming surface toward the centers of the lenses, where there is a circular exit aperture. The apertures positions and flow-directing surface shape may be configured to direct the gas flow so that the drop in pressure with decreasing radius is as required to draw up the glass into the specified convex shape for each lens, against the forces of the hydrostatic pressure and the surface tension of the glass.

In a further embodiment of the invention, newly formed and still soft float glass is patterned in a roll-forming process by the pressure of two rollers, both embossed in barber pole patterns. The resulting arrays of cylindrical lenses at right angles to each other on the upper and lower surfaces act to form point foci.

Types and Uses of Patterned Glass Made by Some Embodiments of the Current Invention Some embodiments of the invention provide an apparatus and method for making a wide variety of patterned glass sheets, as shown in FIGS. 1, 2, 3, 4 and 5. Some embodiments of such sheets take the form of different arrays of plano-convex lenses, as shown in FIGS. 2, 3, 4 and 5. The sections shown may be taken from a glass sheet with the same pattern repeated over larger area. The lower surface 10 is flat, while the upper surfaces 11 are shaped in different patterns. Note that the upper surface 11 is designated with the same reference numeral is several figures to indicate the upper surface that is patterned, but not the particular pattern. Several examples of different patterns of the surface 11 are shown in various drawings, but the general concepts of the current invention are not limited to only the examples shown.

FIG. 1 is a perspective view of a section of a decorative glass sheet shaped by the apparatus and method according to an embodiment of this invention as a simple checker-board pattern of curved raised and lowered depressions.

Figure 2:
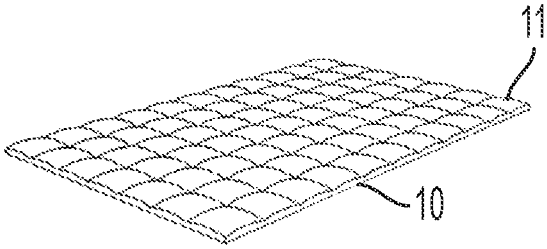
FIG. 2 is a schematic illustration of an array of square lenses according to an embodiment of the present invention.

FIG. 2 is a perspective view of a section of a glass sheet with a plurality of adjacent plano-convex lenses in a square grid shaped by the apparatus and method of an embodiment of this invention. Each lens has an axisymmetric convex upper surface. For making solar photovoltaic modules, it is important that as much as possible of sunlight incident on the lens array be brought to one or other of the lens foci, with minimal gaps between the lenses. Thus, the quilted upper surface is made with sharply defined V shaped valleys separating the individual lenses according to an embodiment of the current invention.

Figure 3:
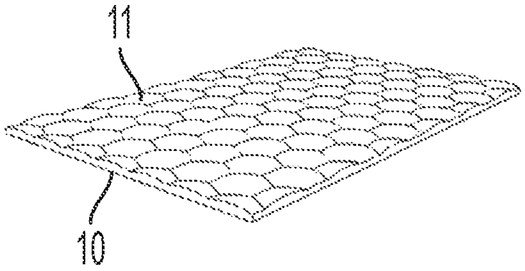
FIG. 3 is a schematic illustration of an array of hexagonal lenses according to an embodiment of the present invention.

FIG. 3 is a perspective view of a section of a glass sheet with a plurality of adjacent plano-convex lenses in a hexagonal grid shaped by the apparatus and method of an embodiment of this invention. Each lens has an axisymmetric convex upper surface. For the application to making solar photovoltaic modules, it is important that as much as possible of sunlight incident on the lens array be brought to one or other of the lens foci, with minimal gaps between the lenses. The quilted upper surface is made with sharply defined V shaped valleys separating the individual lenses according to an embodiment of the current invention.

Figure 4:
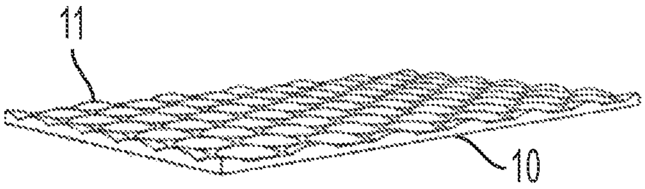
FIG. 4 is a schematic illustration of an array of separated circular convex lenses according to an embodiment of the present invention.

FIG. 4 is a perspective view of a section of a glass sheet shaped as a multiplicity of circular plano-convex lenses by the apparatus and method of an embodiment of this invention. The lenses may be in a hexagonal grid, slightly separated from each other. Such a sheet could be used in high volume manufacture of individual circular lenses, cut from the sheet.

Figure 5:
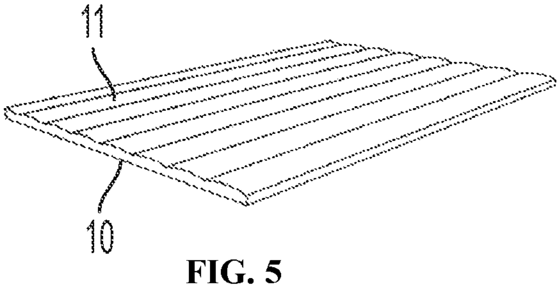
FIG. 5 is a schematic illustration of an array of cylindrical lenses according to an embodiment of the present invention.

FIG. 5 is a perspective view of a glass sheet formed as a plurality of plano-cylindrical lenses formed side by side. Such a sheet could be used for focusing sunlight into line foci. In one embodiment of this invention, such cylindrical lens arrays are combined to produce point foci.

An Embodiment of the Invention for Making Patterned Glass

Figure 6:
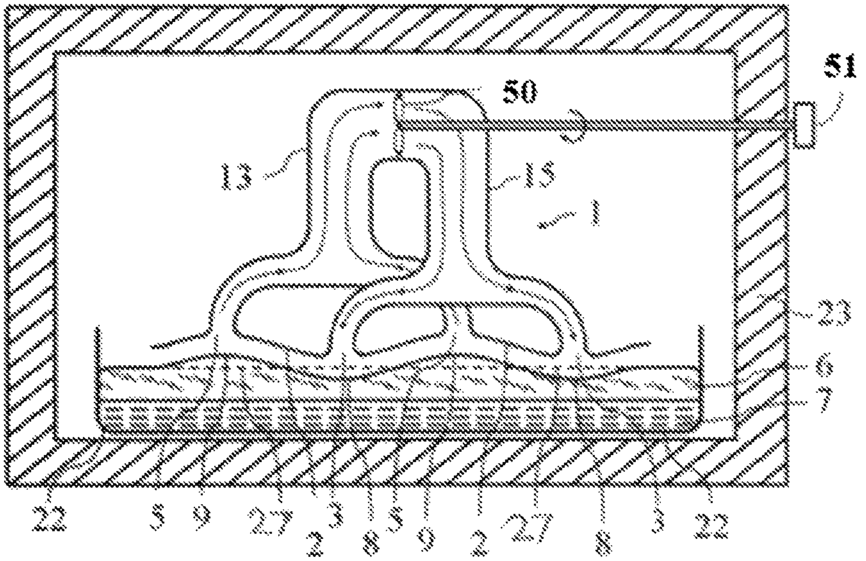
FIG. 6 is a schematic cross-sectional illustration of a manufacturing system according to an embodiment of the present invention.

FIG. 6 illustrates schematically detail of an embodiment of the glass shaping apparatus of this invention, suitable for manufacture of the glass sheet of FIG. 1. The apparatus 1 is shown situated in place above the surface of flat liquid glass 6 floating on liquid tin 7. The liquid glass and tin are contained in a flat vessel 22, which together with the apparatus 1 is enclosed in an oven or furnace 23 in an inert atmosphere or reducing gas, such as the nitrogen/hydrogen atmosphere used in the manufacture of flat float glass.

The apparatus 1 comprises a continuous surface 2 penetrated by a plurality of apertures 3 and 5. Gas enters from plenums 13 and exits from plenums 15, the enclosed volume 12 between the glass 6 and the continuous surface 2, flowing in through apertures 3 and out through apertures 5 to create a pattern of local variations in gas pressure above the glass. The entrance apertures 3 are supplied with gas from plenum 13 at higher pressure $P_1$ and the exit apertures 5 are connected to a plenum 15 at lower pressure $P_3$. In this embodiment a fan 50, driven by a motor 51 located external to the oven or furnace 23, blows nitrogen from plenum 15 into plenum 13 creating a pressure difference and ensuring that the entering and exiting flow rates are equal. The path of gas from entrance apertures such as 3 to exit apertures such as 5 is channeled by the continuous surface 2, which may be shaped to direct the flow to create the pressure profile needed to obtain the desired glass surface pattern. This may take the form of a checkerboard, as in FIG. 1, by extending the entrance and exit apertures in a 2-dimensional array.

The simple embodiment of the apparatus shown in FIG. 6 is illustrative, and that other configurations of apertures flow patterns and other arrangements for creating and balancing gas flow may be used to form other patterned shapes according to other embodiments of this invention. Furthermore, other gases may be used in some embodiments of the current invention.

In an embodiment of a method of manufacture using this apparatus, the apparatus and tray 22 of tin and glass are first heated to be approximately isothermal at a temperature at which the glass 6 is in the form of a viscous liquid. The glass is allowed to approach asymptotically the equilibrium state, floating on liquid tin 7, flat and with uniform thickness, as shown by the dashed line 27. The glass forming apparatus 1 is in position over the flat glass, close but not touching anywhere. To start the forming process, the fan 30 is set in rotation to pressurize plenum 13 and depressurize plenum 15 to initiate gas flow, and the glass 6 begins to take on the desired pattern. Under the entrance apertures 3 the glass surface 8 is depressed, while under the exit apertures 5 it is raised. As the glass surface 8 is depressed, the forming apparatus 1 may be lowered to obtain the desired gas flow and pattern shape.

The ending of the forming process is reached when the glass is close to an equilibrium state, reached asymptotically. In this state the gas pressure applied to the glass surface is in detailed balance with the sum of the two pressures generated by the patterned profile in the glass, namely 1) the hydrostatic pressure from height variations, and 2) the surface tension pressure due to surface curvature. At this point, because the liquid glass is in static equilibrium, hydrostatic pressure is constant at any given level beneath the surface, and the boundary formed between the glass and the liquid tin is flat. Once this equilibrium state is reached, the glass is cooled, preserving the upper surface pattern in a solid glass sheet, specular on both the flat and shaped sides.

When a large array sheet is being made with many repeated pattern units, care is taken through the forming process to balance the different gas pressures so that within the repeated pattern unit being formed the volume of depressed glass is equal to the volume of raised glass, so there is no change in average thickness of the glass and no net lateral flow of glass between pattern elements. In addition, the incoming and outgoing gas flow rates and pressures are balanced, so that there is also essentially no build-up of increasing or decreasing pressure across the full area of the glass, and no net flow of gas between pattern elements.

Figure 7:
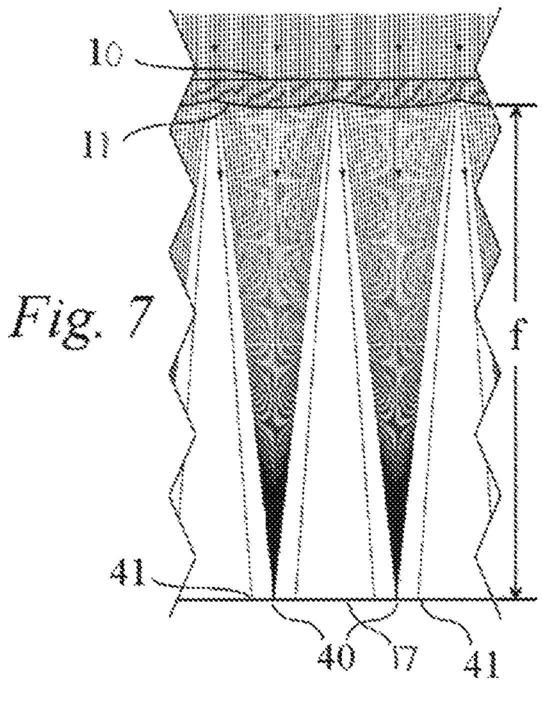
FIG. 7 shows a ray trace of a portion of a convex lens array according to an embodiment of the present invention.

Optical Design Considerations for a Patterned Sheet with a Multiplicity of Convex Lenses FIG. 7 is an optical ray-trace diagram detail of a representative glass lens in an array used to refract entering sunlight into sharply focused points 40 while minimizing the fraction of sunlight rays that are not sharply focused 41. As shown, the patterned sheet is used inverted, so that light enters the glass through the flat side 10 formed against liquid tin and is refracted by the shaped side 11. In a specific example, individual lens surfaces formed on glass side 11 refract collimated parallel rays entering perpendicular to the surface 10 to focal points spaced at distance f below the array on the planar focal surface 17.

The specific shape and scale size of the patterned surface to be imprinted on the upper glass surface to form an array of plano-convex lenses is determined by the desired optical property. The convex curvature required locally on each lens on surface 11 for sharp focus may be approximately paraboloidal, with $$z(r)=r^2/2R, \tag{1}$$

where z is the height of the surface at radius r from each lens center, relative to the height at the lens center and R is the radius of curvature of the lens at its center. For given focal distance f, the radius R is given by $$R=f(n-1), \tag{2}$$

where n is the refractive index of the glass.

Figure 8:
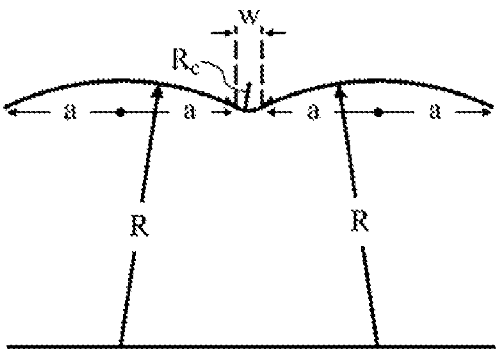
FIG. 8 shows detail of lens boundary according to an embodiment of the present invention.

Because the boundary regions between the individual lenses of an array cannot be made perfectly sharp, sunlight rays refracted through these regions will not be focused, as illustrated in FIG. 7. As shown in the detailed diagram of FIG. 8, between the well-defined lens regions of the surface of aperture a and convex radius R are narrow regions of width w and small concave radius $R_c$. Sunlight rays entering these narrow regions are refracted to points on the receiving surface between the foci of the lenses on either side. The fraction of all entering sunlight not brought to a focus is equal to w/2a in the case of an array of cylindrical lenses, as in FIG. 4, and is approximately w/a for two dimensional arrays of square or hexagonal lenses, as in FIG. 2 and FIG. 3. A high performing lens array that focuses>90% of all entering sunlight must have w/a<0.2 for a cylindrical array, and <0.1 for a two-dimensional array. In the latter case, if the multijunction cells at the focal points had twice the conversion efficiency of the silicon cell at the surface 17 that converts sunlight from the boundary regions, then the gain in conversion efficiency for direct sunlight would be reduced from 100% gain in the ideal case with no boundary regions to 90%, still a very large improvement.

Figure 9:
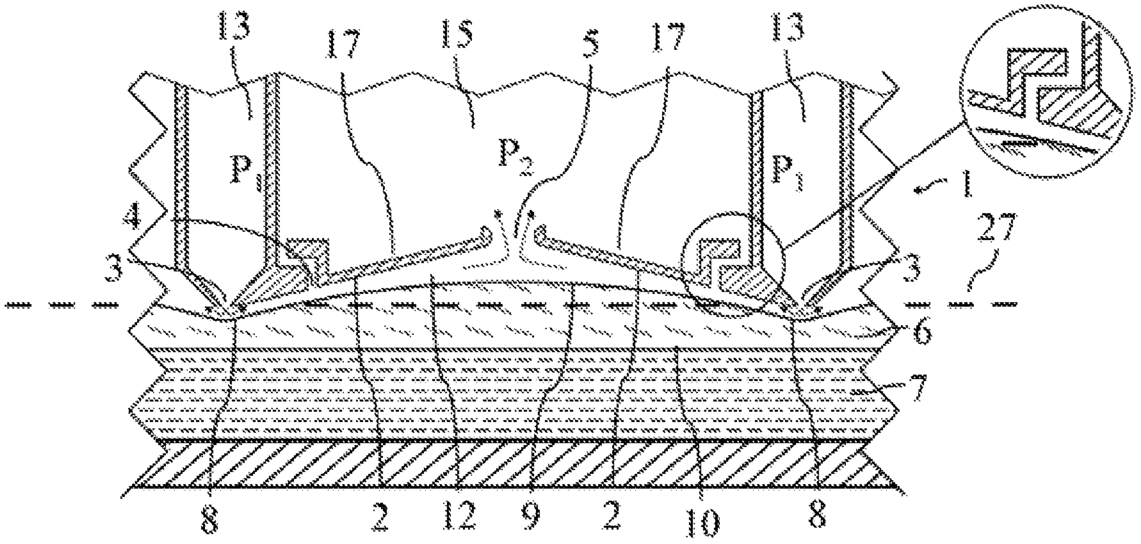
FIG. 9 illustrates schematically a cross section detailed view of a glass shaping apparatus according to an embodiment of the present invention.
Figure 10:
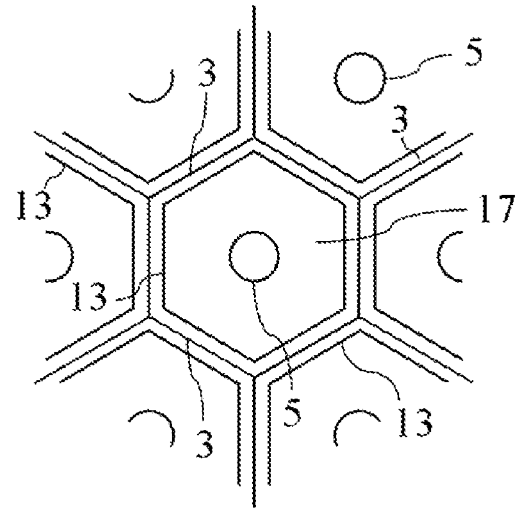
FIG. 10 is a plan view detail of an apparatus to form hexagonal lens elements according to an embodiment of the present invention.

An Embodiment of the Invention for Forming Convex Lens Arrays, with Liftable Sections of the Forming Surface FIG. 9 illustrates schematically a cross section view of a portion of an embodiment of the glass shaping apparatus of this invention, configured for manufacture of the sheets with convex lenses such as those shown in FIGS. 2-5. The apparatus 1 extends to the left and right of the detail shown, to form an array of the same structure repeated multiple times. The shaping apparatus, located in a furnace, oven or float glass factory line, situated above but not touching the surface 8 and 9 of liquid glass 6 floating on liquid tin 7, is shown as it would be located at the end of the shaping process. FIG. 10 shows a plan view of the same element, as part of a hexagonal lens array. The flow of gas to shape the glass enters through the plurality of entrance apertures 3 which take the form of continuously connected jet segments that depress the glass all around the lens boundaries, and a plurality of circular exit apertures 5 where the glass is raised to form the crowns of the lenses.

Gas enters the enclosed volume 12 between the glass 6 and the continuous surface 2 through the entrance apertures 3 that here take the form of narrow slits supplied with gas from plenums 13 at raised pressure $P_1$. The gas jets act on the glass surface immediately below to form a continuous V-shaped perimeter groove 8. The flow entering the enclosed volume 12 above a lens from the perimeter jets flows radially inward to the central circular exit apertures 5 above each lens, where it exits into plenums 15 held at reduced pressure $P_2$. The flow causing a negative radial pressure gradient that raises the glass surface into a convex dome shape 9. The path of gas is channeled by the continuous forming surface 2, which is shaped so as to create the pressure profile needed to form the desired glass surface pattern as an array of convex lenses.

In general, during the shaping process the viscous glass will gradually rise to approach asymptotically the equilibrium design level at which the radial pressure gradient balances the hydrostatic and surface tension pressures within the glass. But in the event of a disturbance that raised the glass higher than the design level, such that the gap between it and the forming surface become narrower than the design level, then for some flow rates the pressure gradient could increase causing the glass to rise beyond the design level, with the potential for a runaway with the glass sucked into the exit aperture 5. To prevent this possibility, in some embodiments the forming surface may be constructed with its inner part 17 above each lens not fixed in place but resting on a perimeter ledge, free to move upward if the force of gas pressure exerted on the bottom of the part 17 were to exceed its weight. By choosing the weight of the part 17 to balance the design pressure in the equilibrium position, the plate may move upward to maintain the design gap thickness and pressure gradient, preventing the fluid from rising above the design level, and achieving the desired stable equilibrium state.

The embodiment of the apparatus shown in FIG. 9 is illustrative. Other configurations of aperture-flow patterns may be used to form other patterned shapes according to other embodiments of this invention.

In a method of manufacture using the above apparatus, the starting point is hot glass 6 in the form of a viscous liquid, flat and of constant thickness, approaching an equilibrium state floating on liquid tin 7. The glass forming apparatus 1 is positioned over the glass, close to the flat equilibrium surface level shown by the dashed line 27, but not close enough to touch it anywhere. To start the forming process, the plenums 13 and 15 are pressurized or depressurized to initiate gas flow, and the glass 6 begins to take on the desired pattern. As the glass surface 8 is depressed locally under regions of high pressure, the forming apparatus 1 may be lowered during the forming toward the position relative to the glass level needed to obtain the desired gas flow and pattern shape.

When a large array sheet is being made with many repeated pattern units, care is taken through the forming process to balance the different gas pressures so that within the repeated pattern unit being formed the volume of depressed glass is equal to the volume of raised glass, so there is no change in average thickness and no net lateral flow of glass. In addition, the incoming and outgoing gas flow rates and pressures are balanced, so that there is also no large-scale build-up of increasing or decreasing pressure across the full area of the patterned glass, no matter how large.

The ending of the forming process can be at or approaching an equilibrium state. In this state the gas pressure applied to the glass surface approaches asymptotically a detailed balance with the sum of the two pressures generated by the patterned profile in the glass, namely 1) the hydrostatic pressure from height variations, and 2) the surface tension pressure due to surface curvature. At this point, because the liquid glass is in static equilibrium, hydrostatic pressure is constant at any given level beneath the surface, and the boundary formed between the glass and the liquid tin is flat. Once this equilibrium state is approached to within the desired accuracy, the glass is cooled, preserving the pattern in solid glass.

An Embodiment of the Invention for Making Convex Lens Arrays, Incorporating Additional Apertures This embodiment is similar to that for convex lens arrays described above, but additional gas entrance or exit apertures to provide additional control of gas flow and pressure are provided.

Figure 11:
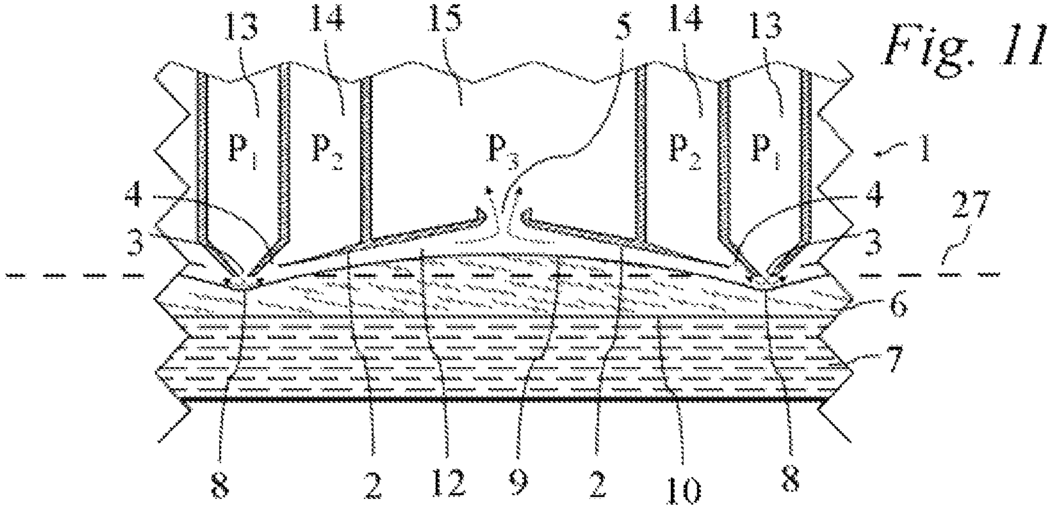
FIG. 11 illustrates schematically a detailed view of a glass shaping apparatus according to another embodiment of the present invention.

FIG. 11 illustrates schematically a cross sectional view of a portion of the glass shaping apparatus 1 according to this embodiment of this invention configured for manufacture of the glass sheets with convex lenses shown in FIGS. 2-5. This embodiment is similar to that shown in FIG. 9 above, but includes additional gas flow apertures to control the pressure flow pattern. The apparatus 1 extends to the left and right of the detail shown, to form an array of the same structure repeated multiple times. FIG. 11 shows the apparatus in place in a furnace or oven, situated above but not touching the surface of shaped liquid glass 6 floating on liquid tin 7, as it would be positioned at the end of the shaping process. The apparatus comprises a continuous forming surface 2 penetrated by a plurality of apertures 3, 4 and 5. Gas enters and exits the enclosed volume 12 between the glass 6 and the continuous forming surface 2 from plenums 13, 14 and 15 above, flowing to create a pattern of local variations in gas pressure above the glass. The entrance apertures 3 here take the form of narrow slits supplied with gas from plenum 13 at raised pressure $P_1$. The slits 3 extend in and out of the paper and the gas enters the enclosed volume 12 in a narrow linear jet at high velocity. This acts on the glass surface immediately below to form a V-shaped groove 8. FIG. 11 shows also a circular exit aperture 5, connected to a plenum 15 held at low pressure $P_3$ and causing a locally region of low pressure that raises the glass surface into a convex dome shape 9. The path of gas from entrance apertures such as 3 to exit apertures such as 5 is channeled by the continuous surface 2, which is shaped to direct the flow to create the pressure profile needed to obtain the desired glass surface pattern. Additional apertures such as 4 connected to the plenum 14 may be incorporated in the continuous surface 9 to control of the details of the flow and pressure variations to obtain the desired shape. In one embodiment, the plenum 14 may be pressurized at pressure $P_2$ to set the radial pressure gradient from under the perimeter entrance aperture 4 to the central exit aperture 5 so as to limit the vertical rise of the glass surface from edge to center. The entrance aperture 4 may be made with width that varies according to position along the boundary between lenses. Thus for example, for given pressure $P_2$, the slit width may be increased from the center of the boundaries to the corners of hexagonal of square lenses, to provide increased gas pressure to balance increased hydrostatic pressure in these corners.

The embodiment of the apparatus shown in FIG. 11 is illustrative. Other configurations of apertures and flow patterns may be used to form other patterned shapes according to other embodiments of this invention.

In a method of manufacture according to an embodiment of the current invention using the apparatus of FIG. 11, the starting point is glass 6, hot enough to be in the form of a viscous liquid, flat and of essentially uniform thickness, in an equilibrium state floating on liquid tin 7. The glass forming apparatus 1 is positioned over the glass, close to the flat equilibrium surface level shown by the dashed line 27 but not close enough to touch it anywhere. To start the forming process, the plenums 13, 14 and 15 are pressurized or depressurized to initiate gas flow, and the glass 6 begins to take on the desired pattern. As the glass surface 8 is depressed locally under regions of high pressure, the forming apparatus 1 may be lowered during the forming toward the position needed to obtain the desired gas flow and pattern shape.

When a large array sheet is being made with many repeated pattern units, care is taken through the forming process to balance the different gas pressures so that within the repeated pattern unit being formed the volume of depressed glass is equal to the volume of raised glass, so there is no change in average thickness and no net lateral flow of glass. In addition, the incoming and outgoing gas flow rates and pressures are balanced, so that there is also no large-scale build-up of increasing or decreasing pressure across the full area of the glass.

The ending of the forming process can be an equilibrium state. In this state the gas pressure applied to the glass surface is in detailed balance with the sum of the two pressures generated by the patterned profile in the glass, namely 1) the hydrostatic pressure from height variations, and 2) the surface tension pressure due to surface curvature. At this point, because the liquid glass is in static equilibrium, hydrostatic pressure is constant at any given level beneath the surface, and the boundary formed between the glass and the liquid tin is flat. Once this equilibrium state is reached, the glass is cooled, preserving the pattern in solid glass.

Figure 12:
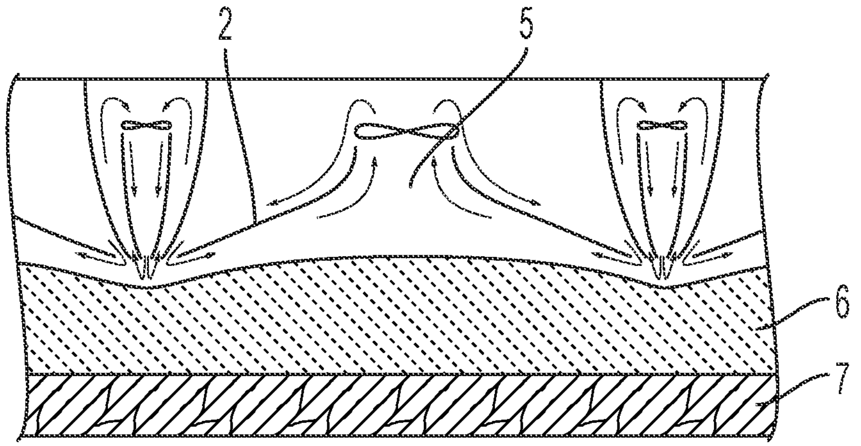
FIG. 12 shows gas flow according to another embodiment of the present invention.

An Embodiment of the Invention for Making Convex Lens Arrays, with Additional Apertures and Two Gas Flows FIG. 12 illustrates a variant of the embodiment described above for making convex lens arrays 6 on liquid tin 7 in which there are two balanced closed flows, the first directed to forming the boundary surface regions between lenses in which the flow from the perimeter jets is returned by exit apertures in the immediate vicinity of the jet. In the second balanced closed flow, gas introduced by entrance apertures adjacent to the jet supplies is guided by the continuous surface 2 as inward radial flow to the central exit apertures 5.

Detailed Balance of Pressure in an Embodiment of the Method

An ending of the forming process can be when the liquid glass has reached a static equilibrium state. In this state the gas pressure applied to the liquid glass surface $P_g$ is in detailed balance with the sum of the two pressures generated by the patterned profile in the glass, namely 1) the hydrostatic pressure $P_h$ from height variations in the glass, and 2) the pressure $P_s$ within the glass arising from surface tension in the curved surfaces. When the liquid glass is in static equilibrium, hydrostatic pressure is constant at any given level beneath the liquid glass surface, and the boundary formed between the glass and the liquid tin is flat, resulting in a flat lower side to the glass which is patterned on the upper side. Once this equilibrium state is reached or approached, the glass may be cooled, preserving the pattern in the upper surface of a solid glass sheet which has a flat lower surface, both sides being specular.

Figure 13:
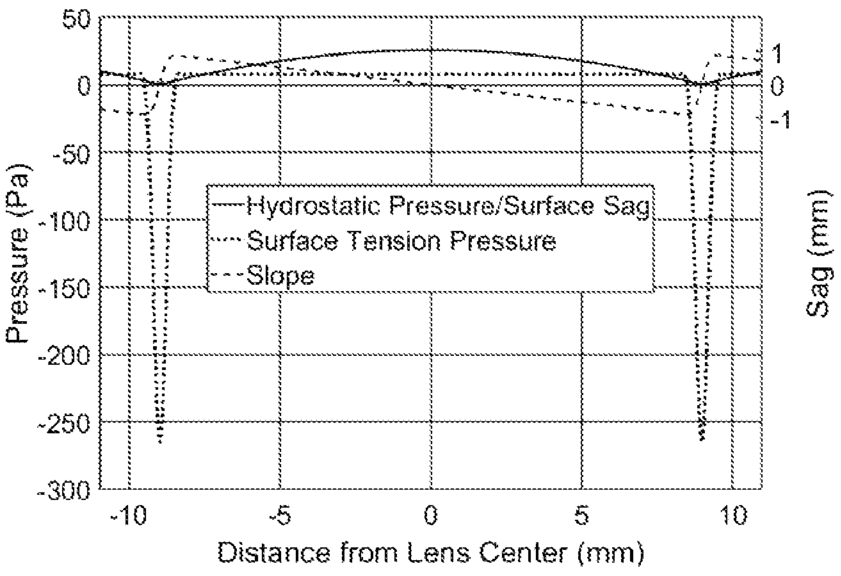
FIG. 13 shows an example of hydrostatic pressure, surface tension and surface slope for a cylindrical lens array according to an embodiment of the present invention.

FIG. 13 illustrates in detail the hydrostatic pressure (solid line) and surface tension pressure (dotted line) for part of an array of cylindrical lenses array with narrow concave boundaries between adjacent convex lenses. The pressure scale is on the left-hand axis. The solid line shows also the profile of the upper surface z(r) of the liquid glass (right hand scale), relative to a horizontal plane at the level of the bottom of the depressions between adjacent lenses. The quantitative values shown were derived using the analysis given below. Here the liquid glass is soda-lime float glass with density $\rho_f$=2500 kg/m$^3$ and surface tension S=0.3 N/m. The cylindrical lenses have radius is R=34 mm and width 18 mm. FIG. 13 shows also as a dashed line the local surface slope across the lens, linear with distance from the center as required for a good focus, and transitioning from one lens to the next in a narrow boundary region.

Detailed Analysis of Pressure Balance for an Array of Convex Lenses

The hydrostatic pressure $P_h$ in static liquid viscous glass is proportional to the height z(r) of the glass surface above a given horizontal plane. Taking this plane to be the same as the reference plane for height, we obtain $$P_h = \rho_f g z(r) = \frac{\rho g(a^2 - r^2)}{2R} \tag{3}$$

where $\rho_f$ is the density of the liquid glass, g is gravitation acceleration.

The additional pressure within the liquid glass exerted by surface tension on account of its surface being curved in three dimensions is given by $$P_s = S\left(\frac{1}{R_1} + \frac{1}{R_2}\right) \tag{4}$$

where S is the surface tension (force per unit length) and $R_1$ and $R_2$ are the two principal radii of curvature. For the lens surface that has been formed to the nearly spherical shape of eqn. 1, $R_1=R_2=R$ and the surface tension pressure within the lens is to a good approximation constant and equal to 2S/R. For a cylinder of radius $R_c$, $R_1=R_c$ and $R_2=\infty$ and the surface tension pressure is approximately equal to $S/R_c$.

In order to form the liquid glass into given shape, the applied gas pressure must balance in detail the sum of the hydrostatic and surface tension pressures prevailing locally below the surface.

To calculate pressure balance in general, we consider the gas pressure at the glass surface needed to obtain given specified array shape. It is convenient to first consider separately the balance of hydrostatic and surface tension pressures in two regions:

1. along the boundaries between lenses, where there must be strong downward pressure to counter the upward net force of surface tension; and
2. above the convex lens regions, where weaker negative and radially variable pressure is needed to counter the combined positive pressures of hydrostatic and surface tension. This pressure must become most negative at the lens centers.

Pressure Balance in the Boundary Region Between Lenses

Figure 14:
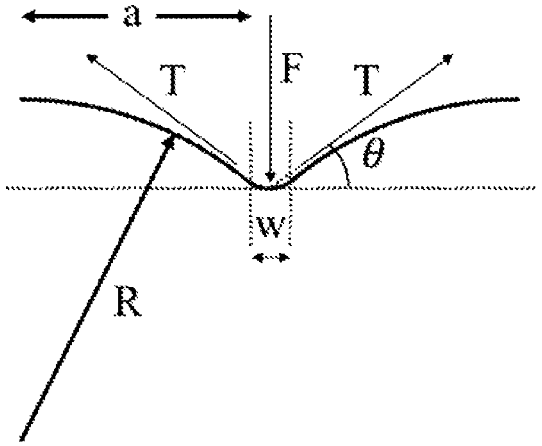
FIG. 14 is a schematic cross-sectional view of lenses and boundary region according to an embodiment of the present invention.

It is convenient to first consider the gas pressure and more specifically the force per unit length that must be applied along the boundaries between lenses, where surface tension pressure is high. FIG. 14 shows a cross-sectional side view of the boundary region between convex lenses of finished shape. The lenses may have circular cylindrical surfaces of radius R, or be axisymmetric with surfaces given by eqn. 1, which for shallow curvature may be approximated as having the curvature of a sphere of radius R. As shown in FIG. 14, there is a transition region of width w between the clear apertures of the lenses. The upward component of the surface tension forces T of the viscous glass on either side of the transition region are to be balanced by a narrow nitrogen jet extending perpendicular to the figure.

From the geometry as shown, with the surface tension forces acting at angle θ to the horizontal, the gas jet force integrated across the boundary region must balance the resultant of the surface tension forces acting on both sides, i.e.

$$F = 2T\sin\Theta \tag{5}$$

For a boundary segment of length L (perpendicular to the plane shown), the surface tension forces on either side in the direction of the surface are given by the equation:

$$T = SL \tag{6}$$

where S is the surface tension coefficient of the liquid glass.

Figure 15:
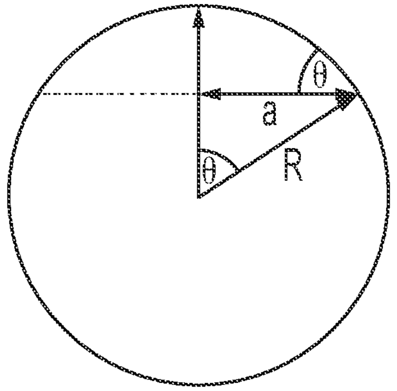
FIG. 15 is a schematic illustration of geometry of spherical lens surface.

Referring to FIG. 15, we see that the angle θ of the forces acting in the plane of the surfaces is given by:

$$\sin\Theta = \frac{a}{R} \tag{7}$$

Combining the equations 5, 6 and 7 we get the resultant upward force F of surface tension acting along a boundary of length L between convex lenses of width 2*a* and radius R:

$$F = \frac{2SLa}{R} \tag{8}$$

The surface tension force F is balanced by the downward force of a gas jet of average velocity $v_{av}$ and with mass flow dm/dt brought to rest at the surface. Thus by Newton's second law:

$$F = \frac{dp}{dt} = v_{av}\frac{dm}{dt} = v_{av}^2\rho A \tag{9}$$

where ρ is the density of the gas and A is the slit area.

Since $A=w_sL$, where $w_s$ is the slit width and L its length, combing equations 8 and 9 and solving for $v_{av}$ yields the equation:

$$v_{av} = \sqrt{\frac{2Sa}{R\rho w_s}} \tag{11}$$

Equation 11 can also be cast in the form of gas jet pressure by dividing by $w_sL$:

$$P = \frac{2Sa}{Rw_s} \tag{12}$$

It follows also that the volumetric flow rate $Q_L$ of gas to the jet of length L is given in terms of the gas density p, glass surface tension S and the system geometry by $$Q_L = L\sqrt{\frac{2Saw_s}{R\rho_g}} \tag{13}$$

These equations apply to the linear boundaries between either cylindrical lenses or spherical lenses of moderate curvature, a<<R.

Figure 16:
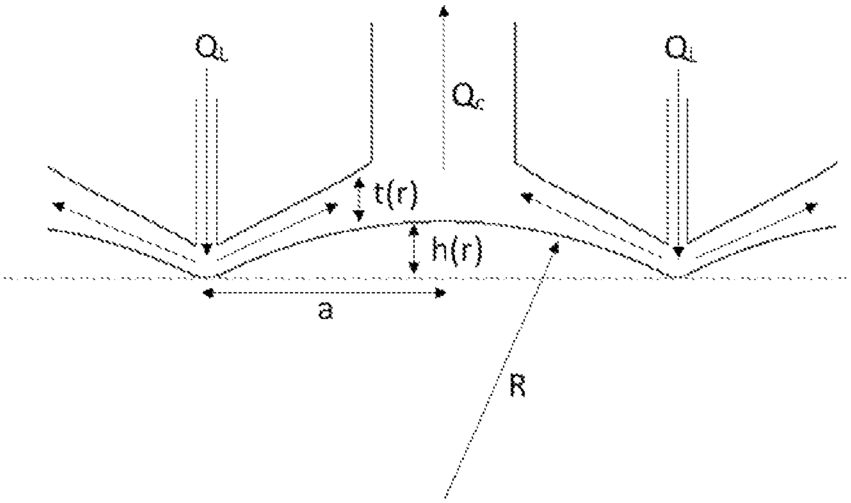
FIG. 16 shows balance of hydrostatic glass pressure and gas pressure over an axisymmetric convex lens according to an embodiment of the present invention.

Pressure Balance Above an Axisymmetric Convex Lens Surface with Inward Radial Gas Flow FIG. 16 illustrates the flow of gas for an embodiment of the apparatus of this invention in which gas flows inward from the perimeter boundary regions toward the crown of a lens, exiting at reduced pressure above the crown of the lens. The lens is axially symmetric, as for a spherical or aspheric lens, and the flow is radially symmetric. The balance of gas pressure $P_g$ with the sum of hydrostatic and surface tension pressures in the glass, from equations 3 and 4, is given by $$P_g = P_h + P_s = \frac{\rho g(a^2 - r^2)}{2R} + S\left(\frac{1}{R_1} + \frac{1}{R_2}\right) \tag{14}$$

In general, for aspheric convex lenses, the principal curvatures vary with radius. But for spherical surfaces they are constant and equal to R, thus surface tension pressure is also constant. Here we analyze this case.

The required gas pressure gradient to balance hydrostatic pressure gradient across the lens surface is proportional to radius, shown by differentiating equation 3 with respect to r:

$$\frac{dP_g}{dr} = -\frac{dP_h}{dr} = \frac{\rho_f g r}{R} \tag{15}$$

For the case that the radially inward flow of the gas in the gap between the glass and the lens perimeter is laminar (planar Poiseuille flow), the radial pressure gradient in the gas $dP_g/dr$ as a function of radius is given by:

$$\frac{dP_g}{dr} = \frac{6\mu Q_c}{\pi r t(r)^3} \tag{16}$$

where μ is the viscosity of the gas, $Q_c$ is the volumetric flow rate to the center and the gap between the glass and the forming surface at radius r is t(r). This equation is valid for Reynolds number Re<2800 when the flow will be laminar, i.e. for $$Re = \frac{2t(r)\rho_f v_{avg}}{\mu} < 2800 \tag{17}$$

The gap t(r) as a function of the lens radius r needed to obtain the gas pressure gradient to form a convex lens of radius R lens may then be obtained by combining equations 15 and 16. Solving for t(r) yields:

$$t(r) = \left(\frac{6\mu Q_c R}{\pi\rho_f g}\right)^{\frac{1}{3}}\left(\frac{1}{r^{\frac{2}{3}}}\right) \tag{18}$$

Then $v_{avg}$ is given by equation 19, $$v(r) = \frac{Q_c^{\frac{2}{3}}}{2\pi r^{\frac{1}{3}}\left(\frac{6\mu R}{\pi\rho_f g}\right)^{\frac{1}{3}}} \tag{19}$$

The shape of the gas flow forming surface J(r) is given by gap spacing t(r) from eqn. 18 to the height of the lens h(r) from eqn. 1 measured from the cusp, i.e.

$$h(r) = z(a) - z(r) = (a^2 - r^2)/2R, \text{ thus} \tag{20}$$

$$J(r) = \left(\frac{6\mu Q_c R}{\pi\rho_f g}\right)^{\frac{1}{3}}\left(\frac{1}{r^{\frac{2}{3}}}\right) + \frac{(a^2 - r^2)}{2R}$$

Figure 17:
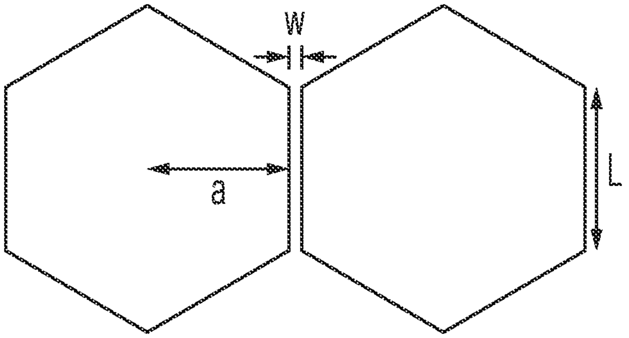
FIG. 17 shows dimensioning of a hexagonal lens array according to an embodiment of the present invention.

Quantitative Analysis of an Embodiment to Make a Specific Array of Hexagonal Lenses Before continuing further with the analysis, we pause here to use it to analyze the design of an apparatus to make a specific representative hexagonal lens array. FIG. 17 shows the layout of the array. The lenses are sized with center to mid-side dimension a=9 mm. The side length L is then 10.39 mm, as is the radius from the lens center to the lens corners. The boundary region width w is set equal to 0.5 mm. This value limits the boundary area loss w/a to be 5.6% of the total array area. Then ideally 94.4% of sunlight entering normal to the lens array will be brought to one or other of the foci. The focal length f of the lenses is chosen to be 67 mm, requiring the glass lenses refractive index of 1.51 to be shaped with radius of curvature R=34 mm, from eqn. 2. To create this array from originally flat glass, conserving average glass thickness requires that the middle of the sides be depressed by 0.5 mm and the Y corners by 0.9 mm, while the lens crowns must be raised by 0.7 mm.

To obtain the jet flow needed to create the boundary regions, we take the float glass surface tension S to be 0.3 N/m. It follows then from eqn. 8 above that the force to counter the surface tension on each straight boundary of length 10.39 mm is 1.65 mN. Making the approximation that the boundary width and the jet width are equal at w=0.5 mm, and assuming the shaping process is undertaken at a temperature of 900° C., when the gas density is 0.3 $kg/m^3$, the average velocity $v_{avg}$ of the gas through the 0.5 mm jet slit to create this force is 32.6 m/sec, from eqn 11, the pressure $P_1$ behind the slit needed to drive this flow from eqn 12 is 318 Pa, and the volumetric flow rate of gas $Q_L$ is 0.17 liters/sec per slit. Given that each lens has 6 sides, and that the flow into each boundary is shared by the two lenses on either side of the boundary, the average input volumetric flow per lens=3 $Q_L$=0.51 liters/sec.

Figure 18:
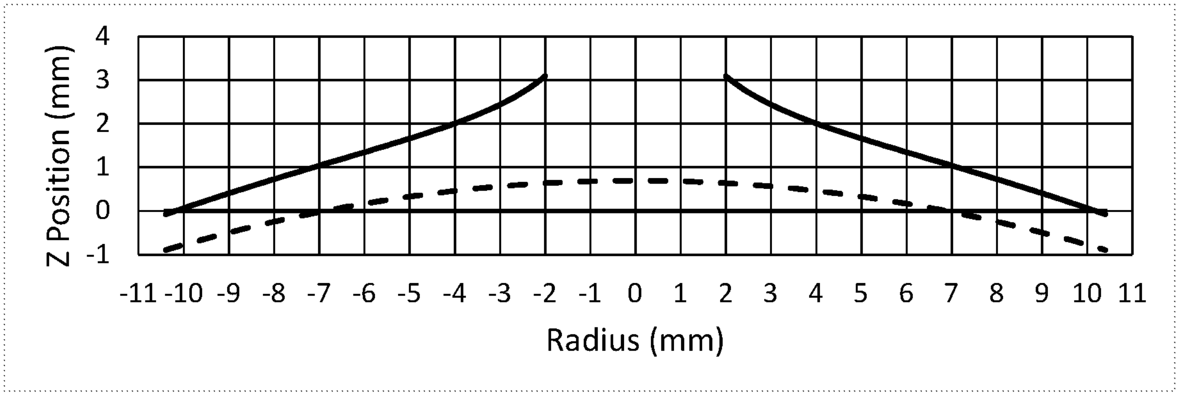
FIG. 18 shows a quantitative result for forming surface (upper solid line) calculated from eqn 20 according to an embodiment of the present invention in which the initial glass surface is the flat solid line at $z=0$, and the final equilibrium glass surface is shown as a dashed line.

For the embodiment for manufacture of convex lens arrays described above in which the inward radial volumetric flow is supplied entirely by the perimeter jet flow, it will be the same 3 $Q_L$, i.e. =0.51 liters/sec. For the example under consideration, the shape and position of the continuous forming surface J(r) relative to the finished lens surface may be obtained from eqn 20, with the result shown in FIG. 18. In this calculation the density $\rho_f$ of the glass is taken to be 2500 $kg/m^2$, and the viscosity of the gas μ at 900° C. to be $4.4\times10^{-5}$ Pa·sec. The gap between the glass and the flow surface which varies as $r^{-(1/3)}$ is narrowest at the perimeter (r=9 mm) at 0.7 mm, and widest at the center exit aperture, at 2 mm. The apparatus of the embodiment of this invention for manufacture of a convex lens array shown in FIG. 9 is shown with this shape.

Equation 19 shows that the average flow velocity is a function of radius, with the maximum average velocity occurring at the outlet vent. If the diameter of the outlet vent is 4 mm, then the average velocity at the edge of the vent is 16.45 m/s. The gap thickness reaches its maximum at the center vent as well, which is 2.45 mm by equation 18. Using the average velocity and gap thickness, the highest Reynolds number along the jet plate is 550 by equation 17. This is well below the threshold for turbulent flow, and therefore the usage of laminar flow equations is justified.

Stability of Convex Fluid Surface Glass Under Radially Inward Flow

Returning to the general analysis, equation 20 shows that the desired axisymmetric paraboloidal fluid shape can be balanced in an equilibrium state given a fixed radial inflow flux $Q_c$ under a forming surface of specific shape J(r). To explore the stability of this equilibrium, the glass fluid surface shape z(r,t) may be calculated for each of a series of time steps, starting with a glass surface of given shape $z(r,t_0)$, flat for example. For each step, the gap thickness t(r) is taken to be equal to J(r)−z(r,t) and the new equilibrium glass shape is found using an equation dz/dr as a function of t(r), and integrating with respect to r to determine the change in z(r) and hence t(r) to be used for the next step.

To obtain dz(r)/dr, the hydrostatic pressure equation (3) is re-written using a general function z(r) instead of assuming a particular shape:

$$P_h = \rho_f g z(r) \tag{21}$$

Taking the derivative with respect to r yields:

$$\frac{dP_h}{dr} = \rho_f g \frac{dz}{dr} \tag{22}$$

Neglecting surface tension pressure, the imposed gas pressure gradient (equation 16) must be equal and opposite the hydrostatic pressure gradient to counteract the effect of gravity on the fluid shape, thus:

$$\frac{dP_g}{dr} = -\frac{dP_h}{dr} \tag{23}$$

Setting equation 16 equal to the negative of equation 16 and solving for dz/dr:

$$\frac{dz}{dr} = -\frac{6\mu Q_c}{\pi\rho_f g r t^3(r)} \tag{24}$$

Equation 24 is numerically integrated to yield the equilibrium fluid shape corresponding to the given thickness profile and flow rate. The movement of the glass over time may then be obtained by solving equation 24 over multiple time steps, using the new gap thickness from each step as the input to the next step. The gas flow rate remains constant over time, but the gap thickness changes as the fluid moves.

Analysis by this method shows that the glass shape converges to a stable equilibrium at the design point when the starting point is flat glass. If the fluid is then perturbed artificially to increase the lens height by a small amount from this equilibrium, it may take on a new and higher equilibrium shape. However, if perturbed upward by a large enough distance, a runaway effect may occur where the fluid is forced up through the central exit aperture.

To prevent this runaway, the forming surface may be engineered to include a central moveable part 17 of specific weight, resting on a perimeter ledge and free to move upward if the force of gas pressure exerted on the bottom of the plate exceeds that weight, as shown in FIG. 9. By choosing the weight to balance the pressure in the equilibrium position, we ensure that the plate will move upward slightly to maintain the design gap thickness, and that the gap thickness remains constant at the design value, thus the fluid cannot be perturbed into an unstable state.

Method of Manufacture with Stepped Lowering of the Apparatus

Figure 19:
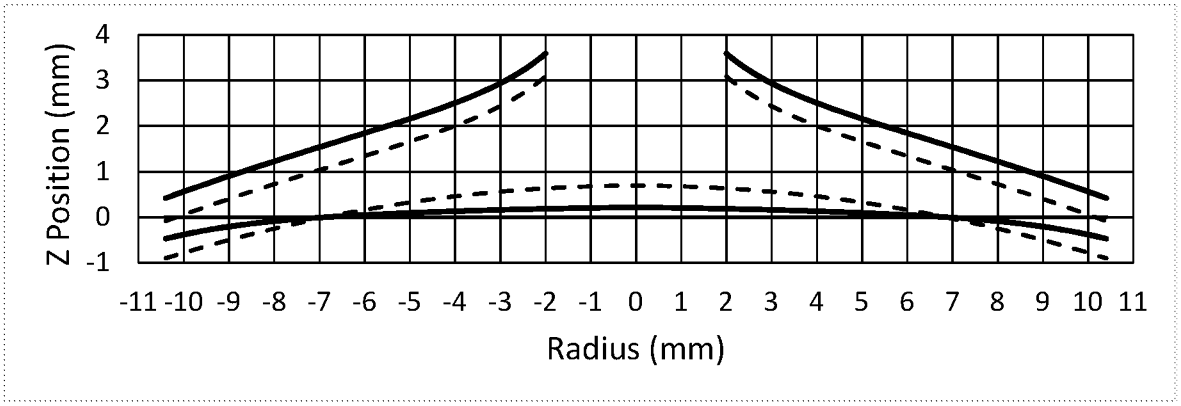
FIG. 19 shows Step 1, dashed lines indicate final positions, solid lines indicate current positions according to an embodiment of the present invention.
Figure 20:
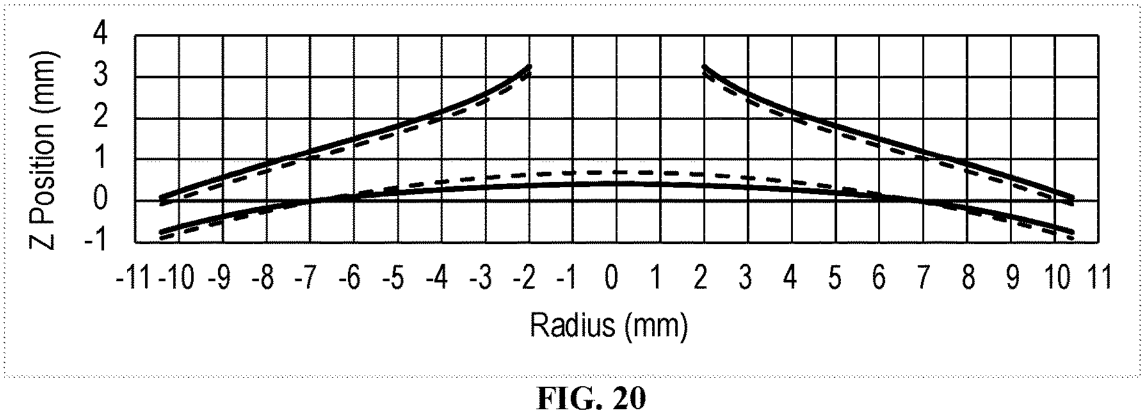
FIG. 20 shows Step 2, dashed lines indicate final positions, solid lines indicate current positions according to an embodiment of the present invention.
Figure 21:
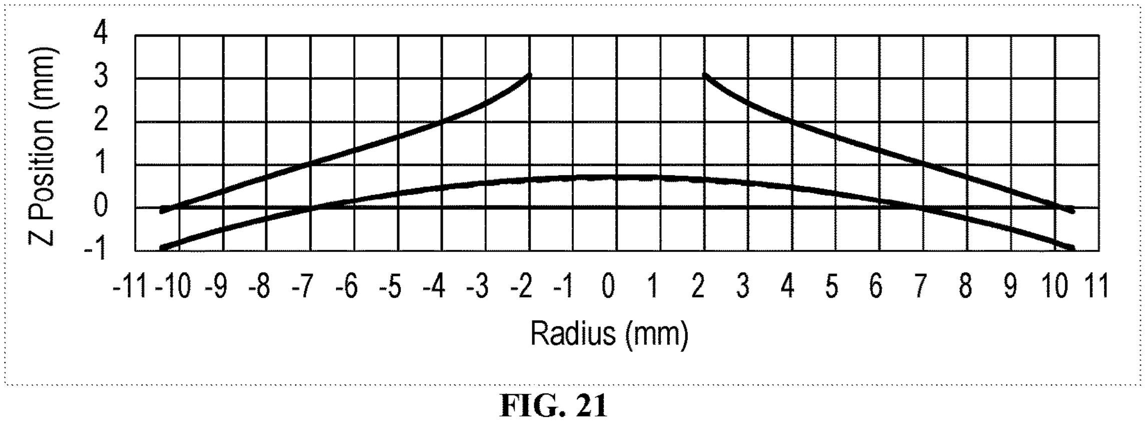
FIG. 21 shows Step 3, current position coincides with final position according to an embodiment of the present invention.

In a method of manufacture in the case that the corner-to-center lens height is greater than the preferred gap t(r) to the forming surface according to an embodiment of the current invention, the starting height of the forming surface may be adjusted during the forming process. FIG. 19, FIG. 20 and FIG. 21 show the results of modeling formation of the desired example lens shape shown by the dashed line in in FIG. 18, in a three-step process. The initial location of the forming surface as shown in FIG. 19 is 0.5 mm higher above the mean glass level (z=0) than its final position. In this initial position, the equilibrium z(r), for the same volumetric flow rate is as modeled in FIG. 18, was calculated iteratively using equation 24 is as shown. The lens shape with the higher forming surface location is only partially formed, but the corners are depressed enough that the apparatus and forming surface may be lowered 0.35 mm without risk of contact. Continued operation at the same volumetric flow then yields the glass shape of FIG. 20. The corners are now low enough that the apparatus may be lowered a further 0.15 mm to its final position, and shaping to the design lens array surface completed, shown in FIG. 20.

An Embodiment with Manufacturing Integrated into a Float Glass Manufacturing Plant In an embodiment of the method of manufacture for solar glass lens arrays, for the lowest cost production the patterning process may be integrated into a dedicated float glass plant. These plants may have continuous production of 500 tons of glass per day. Given 4 mm thickness and 40% conversion efficiency, the annual production by a single plant would be sufficient for 700 MW of hybrid silicon/multijunction PV modules, a bit less than 1% of current global PV module manufacturing volume. In the plant, glass flows onto liquid tin at a temperature of 1050° C. (viscosity 1000 Pa·sec) where it settles to a moving flat strip. For a 4 m wide strip, and at 4 mm thickness, the hot glass moves down the line at ~0.143 m/sec. In normal manufacture, the moving glass strip is cooled and hardened, and is taken off at 600 C.

To incorporate the shaping process, the float line may be extended in length to add the shaping apparatus of this invention. Units of the shaping apparatus, which may be 1 m×2 m is size, are placed over the moving glass in the added pattern shaping section of the line, and are moved down the line to precisely follow the glass, which may be held isothermal during the shaping process, and then cooled.

The number, area and cost of the shaping apparatus units depends on the time for shaping and cooling. The time constant r for viscous flow settling under gravity is of order $$\tau = \mu/t\rho g, \tag{26}$$

where t is the characteristic spatial scale. For the lens array with the dimensions given above, for float glass at 910 C (viscosity μ=10,000 Pa·sec) and t=0.001 m, the time constant τ is 75 sec. The time needed to approach the equilibrium state of ~3 τ at this temperature may be thus of order 225 seconds, and the added length to the float line for shaping, at a line speed of ~0.143 m/sec, is around 32 m. At the end of shaping, the glass may be quickly cooled by ~100 C in, of order, a minute by reducing the temperature of the gas jet, requiring the apparatus continue moving with the glass for another 8 m. The units are then be returned to the hot end of the line, taking another minute. A total of 100 shaping units each 2 $m^2$ in area may thus suffice for the modified plant. Each unit thus yields 2 $m^2$ of lens array every 6 minutes, or 175,000 $m^2$/year. The value added to the glass by patterning is around \$4/$m^2$, thus each shaping unit is valuable, contributing a major fraction of added value of \$0.7 million/year.

One Small Lens Formed by the Method of Manufacture of this Invention

Figure 22:
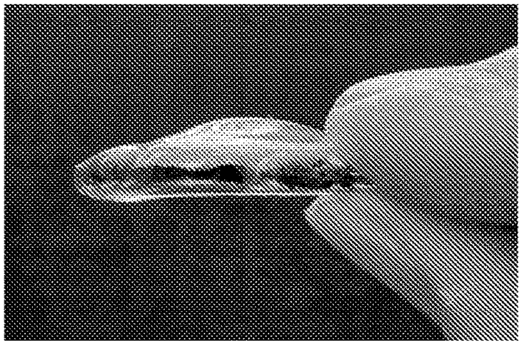
FIG. 22 is a photograph of a glass lens made by a method according to an embodiment of the present invention.

FIG. 22 is a photo of the first glass lens to be shaped by only fluid contact, made using float glass in a laboratory test of this method of manufacture. The lower surface, formed on liquid tin, is flat, like float glass, while the upper surface was drawn up into a convex shape by the pressure of nitrogen gas acting on the glass in a liquid state.

Figure 23:
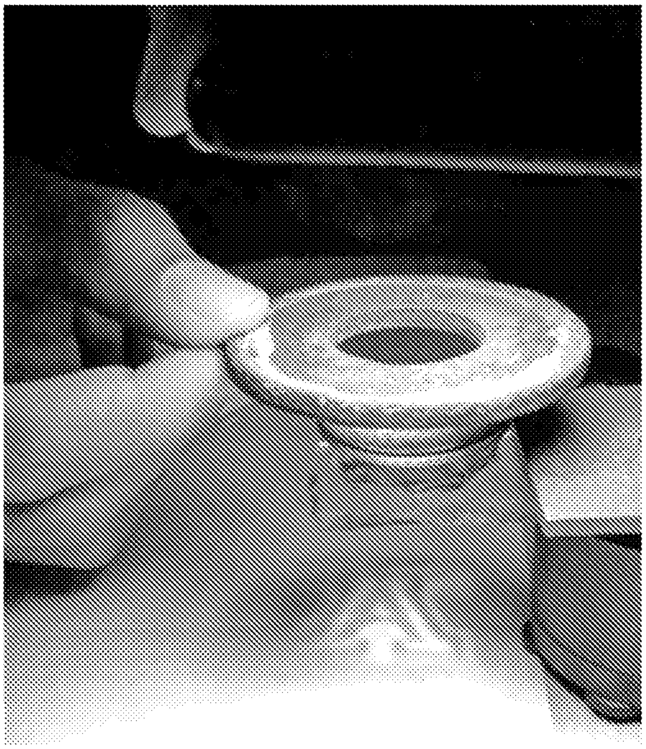
FIG. 23 is a cell phone screen imaged by the lens of FIG. 22.

FIG. 23 shows an image of the University of Arizona logo, projected onto a white screen by the plano-convex lens of FIG. 22. The illuminated source was a cell phone screen above.

Figure 24:
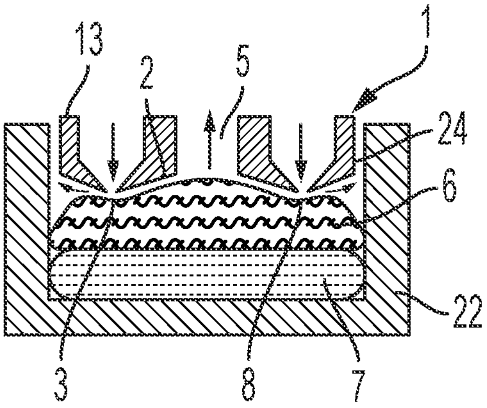
FIG. 24 is a cross sectional view, drawn to scale, of the apparatus used to make the lens of FIG. 22.

FIG. 24 is a diagram of the axisymmetric shaping apparatus used to make the lens of FIG. 22, with liquid glass 6 floating on liquid tin 7, shown at the end of the shaping process. Nitrogen gas entered from plenum 13 through a circular perimeter jet 3, 0.5 mm wide and 18 mm in diameter, forming in the glass a continuous circular perimeter groove 8. The entering gas flows both radially inward to the 6 mm diameter central circular exit aperture 5, and also radially outward to the 0.65 mm wide and 35 mm diameter cylindrical gap 24 between the forming apparatus 1 and the wall of the container 22. The inward radial path of gas was channeled by the continuous forming surface 2, in the shape of a shallow cone with a 65° half angle.

The starting glass material was a flat octagon approximately 22 mm diameter cut from a sheet of 4 mm thick low iron float glass. This piece of glass was placed on a disc of tin and set in the assembly of FIG. 24. The furnace temperature was then raised to 900° C. and held at this value until the glass 6 was equilibrated in the form of a viscous liquid with a flat upper surface floating on liquid tin 7. To start the forming process, isothermal nitrogen at 900° C. was introduced into the plenum 13 at a controlled flow rate of 1 liter/sec. The forming process was carried out with the temperature held at 900° C. for 15 minutes, during which time the glass settled to the final near-equilibrium shape measured from the finished, cooled product of FIG. 22. At the end of the forming process, the entering nitrogen flow was divided equally, with 0.5 liter/sec going radially inward to the central exit 5, and 0.5 liter/sec going radially outward to the cylindrical gap 24.

Figure 25:
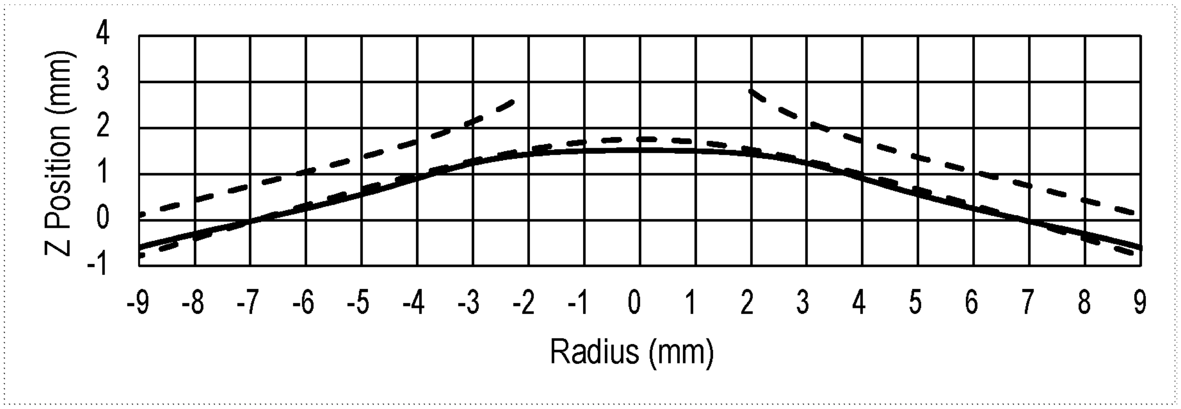
FIG. 25 shows a lens surface as measured (dashed line) and as calculated (solid line) according to an embodiment of the present invention.

FIG. 25 shows the result of a calculation of the equilibrium shape based on the measured parameters of the apparatus used and a flow rate of 0.5 liter/sec. The calculated equilibrium lens shape shown as a solid line is close to that of the measured shape (dashed line). It was produced by modeling the radial flow gap thickness equal to 0.6 mm, the same as in the experimental apparatus (within measurement error). In this model, the hydrostatic pressure of the modeled surface is balanced by the radial dependence of the nitrogen gas pressure flowing toward the center exit aperture 5. The calculated surface is flatter on top than that of the actual lens, because the model did not account for differential surface tension pressure from changing curvature across the lens surface.

Method of Manufacture of a Lens Parquet by Embossing Using Mold Surfaces with Sharp Cusp Boundaries Between Lenses In some applications a glass lens array may be demanded with minimal boundary losses, less that those achievable with no mold contact by the above embodiments. For such applications, the glass may be press-molded using a mold made with sharp cusp boundaries to form sharply defined lenses. Further, to obtain a precision lens FIG., the individual lens element shapes of the mold must be precisely shaped. For mass production at low cost, a practical and inexpensive way to restore the accurate element shapes and sharp cusps is needed.

Figure 26:
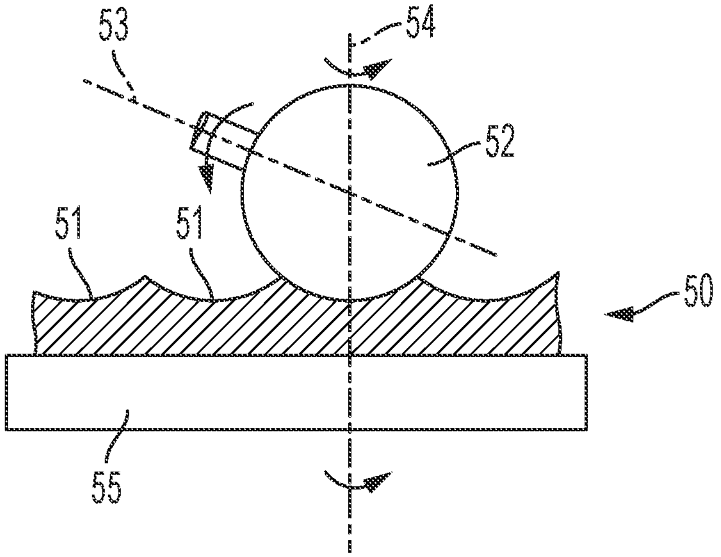
FIG. 26 shows lapping a concave mold surface according to an embodiment of the present invention.
Figure 29:
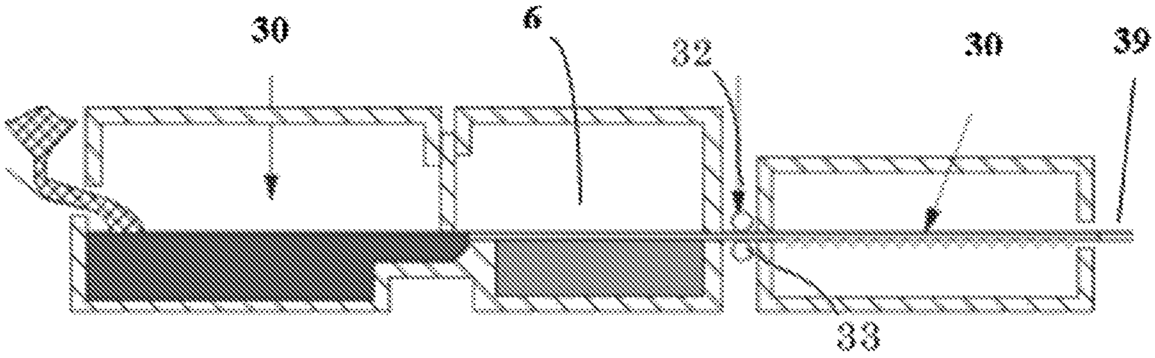
FIG. 29 shows a method of manufacture of lens arrays by continuous production according to an embodiment of the present invention.

FIG. 26 illustrates a method to manufacture and later restore a mold 50 configured to press-mold an array of plano-convex lenses with spherical figure on either a flat surface, as shown, or a cylindrical roller, as in FIG. 29. The mold material may be a ceramic or an alloy suitable for glass molding. The individual lens mold surfaces 51—cups—were previously machined into the mold material, using preferably a hemispherical diamond-studded tool. Then the work is mounted on a turntable 55 and ground and polished spherical with a hard ball lap 52 as shown.

The same lap 52 may be used to work all the cups in a mold array. It is used first with the coarsest grit, sequentially round robin style, until all cups are ground to the same radius. The ball may be turned continuously during the work about an axis 53, and to ensure that as it wears it keeps a true spherical surface, it may occasionally be repositioned relative to the axis. Also, during the lapping and polishing processes, the mold 50 is rotated about an axis 54 that passes through the center of the cup being worked. Whichever cup is being worked at any one time, the mold 50 is reoriented moved so that it is centered on the axis of rotation 54 of the supporting turntable 55. Then the same hard tool 52 is used with the next finer grit, again to work all the cups to identical but smaller radius, and so on all the way down to complete the polish. In this way, the individual polished cup shapes are all polished to the same spherical radius, even though the spherical ball tool is ground down and reduced in radius as the lapping proceeds. If there is too much wear to be handled by a single ball, then a multiplicity of balls may be used, provided they are all used throughout, and wear down together, keeping all the same radius at any time. Preferably, no pitch or soft material is used even for polishing, in order that the cusps remain sharp and the mold surface remains part of the same sphere right up to the sharp cusp boundaries.

Figure 27:
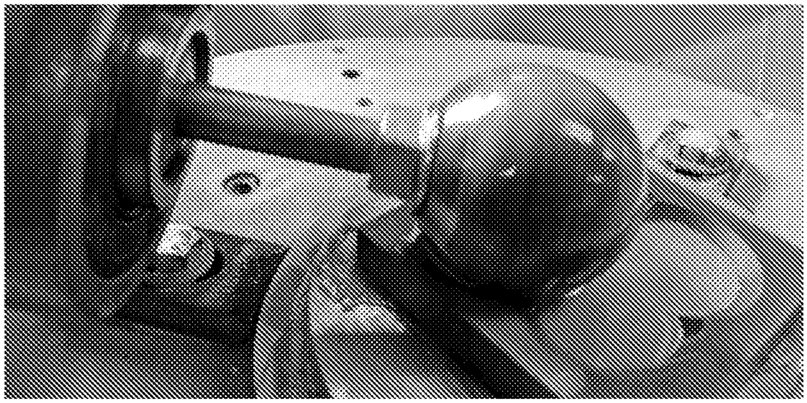
FIG. 27 is a photograph of a mold during a lapping process according to an embodiment of the present invention.

FIG. 27 is a photograph of a 4-element test mold, being ground from silicon nitride ceramic by the above procedure. The 2×2 array is on a 25 mm square grid, and the spherical surfaces are made to R=25 mm radius, the radius of the ball.

Figure 28:
FIG. 28 shows a Polished mold according to an embodiment of the present invention.

FIG. 28 shows the same mold after polishing, carried out with the same steel ball lap directly with a fine diamond slurry.

A lens array of low-iron float glass was press-molded using this mold, at a molding pressure of 25 MPa applied for 15 minutes. The optical quality of the molded lens array in terms scattering at the lens boundaries was measured by translating a 532 nm laser beam of 100 μm width across a boundary between lenses and measuring as the power switches between two adjacent foci of the lens array. The transition from all the power in the first to all in the second was completed for a translation of 300 μm. Given the finite laser beam width, this corresponded to an optical broadening width w of 250 μm. This in turn corresponds to a fractional loss of collimated light entering an extended 2-dimensional square lens array of w/a=2%. This is much superior to the loss of >10% typical of two-dimensional glass lens arrays made by conventional press-molding methods.

In one embodiment, a flat mold with concave cups meeting in sharp cups may be pressed into a heated and softened sheet of glass resting on a flat surface. In a second embodiment, a cylindrical surface with sharply delineated cups is prepared on a cylindrical embossing roller, and the lens array made by roll-forming in continuous production. FIG. 29 illustrates this second method, in which the glass surface may be embossed with features having a depth of 1 to several mm.

Molten glass from the furnace 30 passes to a float bath with liquid tin 7. Flat float glass 6 emerging from the float bath is embossed by passing between two rollers 32 and 33 and passes on to an annealing oven and cooling lehr 38. Cooled molded glass 39 emerging from the lehr is inspected and cut into pieces.

Figure 30:
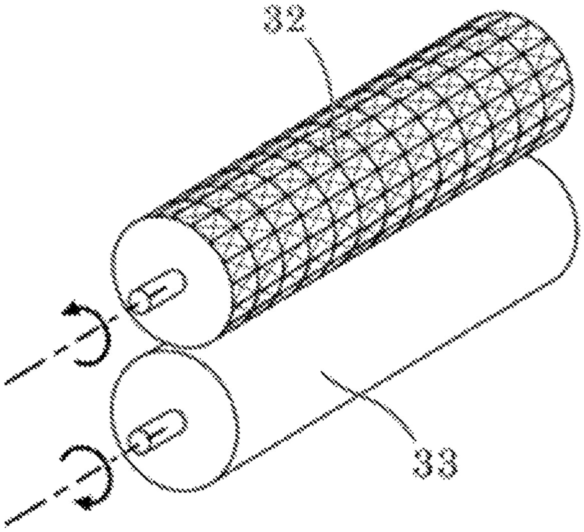
FIG. 30 shows a roller for embossing a lens parquet according to an embodiment of the present invention.

FIG. 30 shows the two rollers. Roller 32 is prepared with a quilted surface of concave cups, over the full cylindrical surface of an embossing roller, the other roller 33 has a smooth surface.

A Two-Sided Glass Lens Array Made with Cylindncal Lens Surfaces to Form Point Foci A potential difficulty with molding a parquet of lenses as described above is entrapment of gas at the crown of the inverted concave cups as soft glass is pressed up into each cup to fully form the crown of the lens surface. Such entrapment is likely to be less problematic for roll-forming but may still require a vacuum rather than gaseous environment, increasing difficulty and cost.

Such entrapment may be minimized or eliminated in arrays of lenses that are cylindrical rather than spherical. In U.S. Pat. No. 9,156,720 B2, Krasnov describes a method of patterning glass between two rollers to form an array of aligned cylindrical lenses on either side of the glass sheet. The application is for use in concentrating photovoltaic systems, by placing linear multijunction PV cells along the solar line focus. However, the amount of concentration achievable at line foci is fundamentally limited by consideration of optical etendue to around 100×, while the highest efficiency conversion requires concentration of at least several hundred times, and in addition, cost is reduced when cell size is reduced, as is the case at high concentration. There is thus room for improvement in the manufacture of two-dimensional glass lens arrays, to obtain high concentration point foci.

While a convex cylindrical lens array surface alone can yield foci in the form of parallel lines, two such surfaces can be combined to form point foci.

Figure 31:
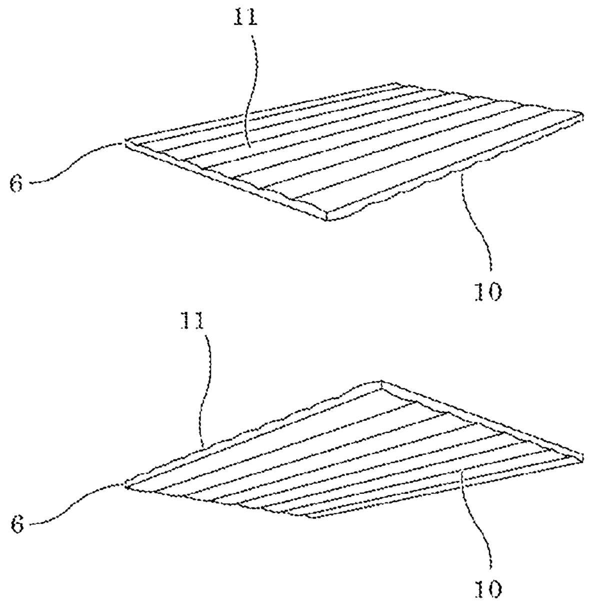
FIG. 31 is a single-piece glass lens array made from crossed cylindrical lenses shown in two views, (a) top view, (b) view from below according to an embodiment of the present invention.

FIG. 31 shows a two-dimensional lens array implemented in the form of orthogonal cylindrical arrays on either side of a sheet of transparent material. The convex cylindrical lenses on the upper side 11 are at right angles to those on the lower side 10. The focusing property of such an array is essentially the same as a two-dimensional array of square convex lenses, as shown in FIG. 2.

Collimated light entering through cylindrical lenses on the upper surface 11 is focused toward line foci and is further focused to an image plane of discrete point foci as it exits through the orthogonal cylindrical lenses on the lower surface 10.

According to some embodiments of the current invention, to obtain sharp foci for relatively fast focal ratios of 4 or less the profile of the lens surfaces of both arrays will preferably be shaped as conic sections rather than as circles, with a conic constant chosen to eliminate optical aberrations. The height, Z, of the surface across the cylinder, at distance x from the center line of the cylinder, is given by $$z = \frac{c_x x^2}{1 + \sqrt{1 - (1 + k_x) c_x^2 x^2}}$$

where $c_x$ is the curvature of the surface, equal to 1/(radius of curvature) and $k_x$ is the conic constant for that surface.

Figure 32:
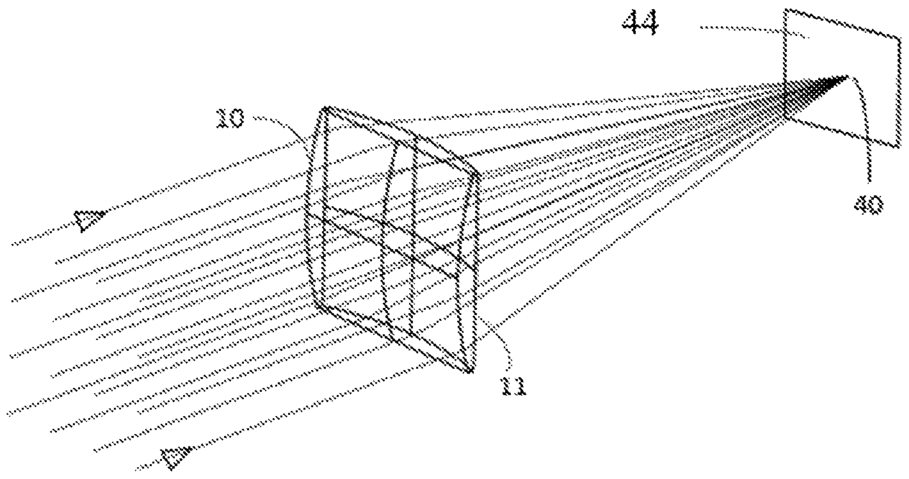
FIG. 32 shows detail of a single lens element of an array, showing rays of light brought to a focus according to an embodiment of the present invention.

FIG. 32 shows a representative single lens of the crossed cylindrical array according to an embodiment of this invention, made of soda-lime float glass. The elliptical first (entry) surface 10 with radius of curvature 1.59 times the lens aperture and conic constant $k_x$=−0.46. The second (exit) surface 11 is hyperbolic with radius of curvature 1.49 times the lens aperture and the conic constant $k_y$=−2.16. The lens forms a sharp point focus 40 on a focal surface 44 at a distance 3 times the lens aperture (f/3). The lens thickness at the center as illustrated is ⅕ the lens aperture.

In prior art, small crossed cylindrical lens arrays are press-molded from glass, but only at very small scale, for example, Sumita Glass molds an 8 mm square array of 300 lenses, each one 0.25 mm in width with sagittal depth of 0.02 mm. Crossed arrays assembled from two individual cylindrical arrays are described, but again on a small scale, e.g. U.S. Pat. No. 6,791,696 B1. Thus current methods of manufacture leave room for improvement for the manufacture of the two-dimensional arrays of meter-scale with individual lenses on the scale of 10-30 mm, with deeper features of one to several mm in depth, and at the very low cost desired for applications such as solar energy generation.

Method of Manufacture of Two-Dimensional Lens Arrays by Bonding Together Two Glass Sheets Embossed with Cylindrical Lenses Current state of the art in continuous production of float glass, as in FIG. 26, provides for one-dimensional arrays of cylindrical features, such as reed glass used for decorative purposes. Most commonly these cylindrical features are concave, but float glass embossed on one side with convex cylindrical arrays is also made.

Figure 33:
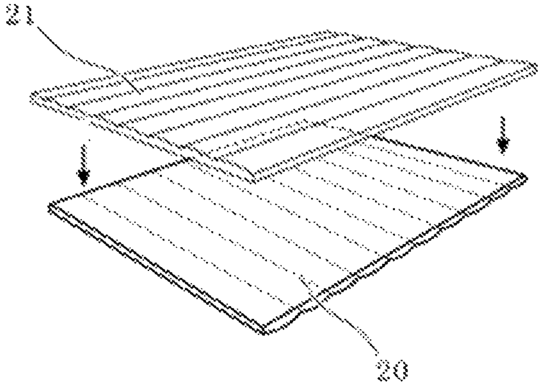
FIG. 33 shows a glass lens array being assembled from two sheets of glass embossed with cylindrical lenses according to an embodiment of the present invention.

FIG. 33 illustrates a first method of manufacture according to this embodiment of the current invention to make a single two-dimensional glass lens array in which two separately roll-formed sheets 21 and 22 are bonded together by optically transparent adhesive. Each of the two sheets is embossed with an array of cylindrical lenses whose profile is preferably elliptical for the upper surface 21 and hyperbolic for the lower surface 22. Before bonding the sheets are arranged with the cylindrical embossed sides facing outward, and at right angles to each other, as shown.

Figure 34:
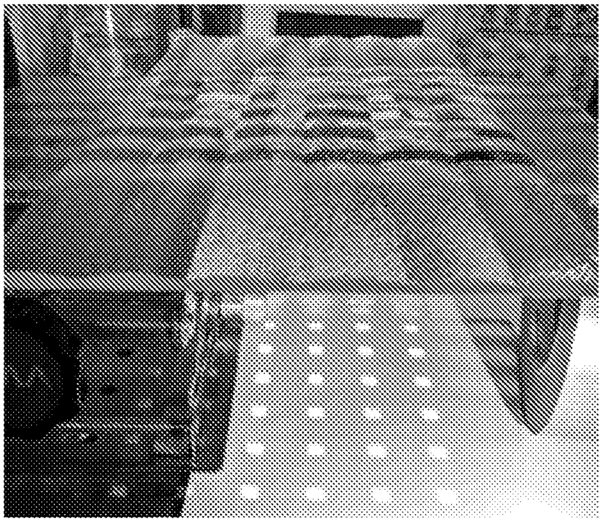
FIG. 34 is a photograph of light focused by bonded reeded glass according to an embodiment of the present invention.

FIG. 34 shows a laboratory test of this method in which collimated light from above is brought to multiple foci below by a sandwich of two commercially embossed reeded glass sheets, bonded with transparent adhesive. The foci are square patches rather than points, because the convex cylindrical surfaces of the embossed glass sheets as currently manufactured do not have the correct surface profiles.

A disadvantage of this method of manufacture is that each of the two separate sheets must be thick enough to be safely handled. As a result, the bonded array may be thicker than necessary, increasing the loss of transmitted light by absorption. Further, the added material and separate handling of the sheets for bonding increases manufacturing cost.

Method of Manufacture of Two-Dimensional Lens Arrays with Orthogonal Arrays of Embossed Glass Cylindrical Lenses on a Single Sheet of Glass In a second method of manufacture for lens arrays from float glass in continuous production according to an embodiment of this invention, a single sheet of float glass is embossed as shown in FIG. 26 with cylindrical lenses on both sides using two embossed rollers, i.e., rollers on both sides, 32 above and 33 below. In this method molten glass from the furnace 30 passes to a float bath 6. Flat float glass emerging from the float bath passes between the two rollers 32 and 33 to be embossed with cylindrical lenses on both sides, as shown in FIG. 31. It passes on to an annealing oven and cooling lehr 30. Cooled glass 39 emerging from the lehr is inspected and cut into pieces.

Figure 35:
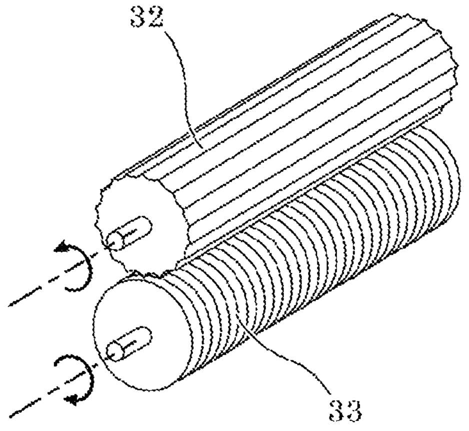
FIG. 35 shows detail of embossing rollers oriented at 0° and 90° to the roller axes according to an embodiment of the present invention.

FIG. 35 shows roller 32 with a surface of concave cylinders oriented parallel to the roller axis, while roller 33 has a surface of concave cylinders oriented perpendicular to the roller axis.

Figure 36:
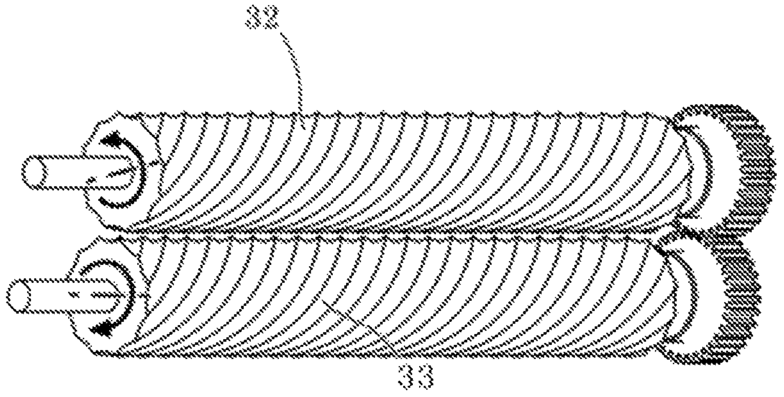
FIG. 36 shows an example in which concave cylinders on the embossing rollers are oriented at 45° to the roller axes according to an embodiment of the present invention.

The direction of the cylinders on the two rollers may be set differently to that shown, as long as they are at right angles, to avoid the possibility that gas may become trapped somewhere under the long cusped grooves of roller 32 when oriented as shown in FIG. 35. FIG. 36 shows a highly preferred embodiment in which concave cylinders on the embossing rollers are oriented at 45° to the roller axes, like a barber pole. Then as the glass is squeezed to come into full contact with the concave cylindrical surfaces, it has room to flow out smoothly to either side, eliminating entrapment of gas minimizing the rate of wear of the cusps between each concave groove.

Figure 37:
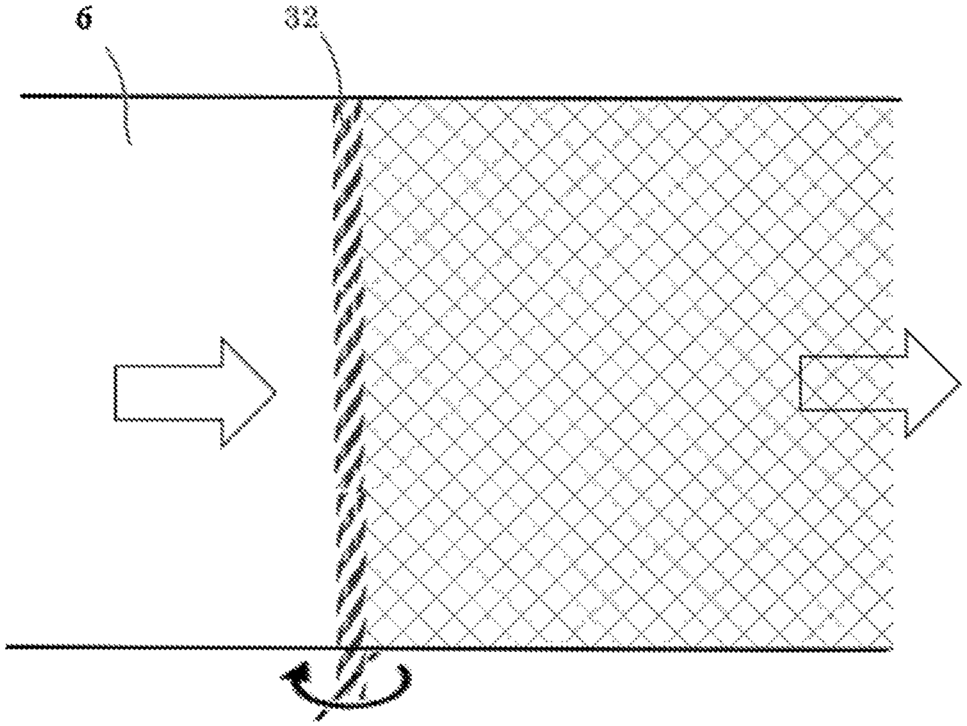
FIG. 37 shows a plan view of a two-dimensional float glass lens array being embossed between barber-pole rollers patterned at ±45° according to an embodiment of the present invention

FIG. 37 show a plan view of flat float glass 6 entering between the rollers as shown in FIG. 36, roller 32 above and roller 33 below (hidden below 32), and glass emerging with the lens array embossed with orthogonal cylindrical lens arrays, above and below, as shown in FIG. 31, and oriented at 45° to the forward motion of the glass.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A method of manufacturing large lens arrays from glass, comprising:

heating glass to take a form of a glass sheet of viscous liquid glass floating on liquid metal, the glass sheet having a lower surface in contact with the liquid metal and an upper surface on an opposite side of the glass sheet away from the liquid metal;

applying a gas flow on the upper surface of the glass sheet to cause the upper surface of the glass sheet to form a pattern of convex lenses in response to local variations in a pressure profile of the gas flow; and cooling the glass sheet to solidify into a rigid, patterned glass sheet, wherein both the lower and upper surfaces of the patterned glass sheet are locally smooth to have a specular finish, wherein the upper surface of the patterned glass sheet is formed into the pattern of convex lenses, wherein the applying the gas flow comprises applying the gas flow through a plurality of exit apertures that are proximate a plurality of entrance apertures arranged in a preselected pattern with a continuous forming surface between adjacent exit apertures and entrance apertures, wherein the plurality of exit apertures, the plurality of entrance apertures and the continuous forming surface are positioned proximate the upper surface of the glass sheet of viscous liquid glass without coming into contact therewith, and wherein applying the gas flow on the upper surface of the glass sheet provides a gas pressure profile such that gas pressure of the gas pressure profile locally balances forces of surface tension due to surface curvature and hydrostatic pressure due to height variations of the viscous state of the glass sheet thereby causing the glass sheet to form the preselected pattern by asymptoticly approaching an equilibrium causing the glass sheet to settle into and take on the preselected pattern, wherein gas entering through the plurality of entrance apertures at higher pressure locally depresses the glass sheet to form boundary regions between adjacent convex lenses, while gas exiting through the plurality of exit apertures at lower pressure locally raises the glass sheet to form the convex lenses, and wherein the lower surface of the patterned glass sheet remains flat in contact with the liquid metal.

2. The method of claim 1, wherein the pattern is formed in the upper surface of the glass sheet in response to the gas flow without any solid contact to the upper surface of the glass sheet.

3. The method of claim 1, wherein the gas flow through the plurality of exit apertures and an outward gas flow through the plurality of entrance apertures are substantially equal to provide a substantially zero net gas flow.

4. The method of claim 3, wherein a change in pressure on the glass sheet resulting from the gas flow averages to zero, and wherein an average height of the glass sheet as patterned is unchanged from an average height of the glass sheet of viscous liquid glass prior to being patterned.

5. The method of claim 4, wherein prior to the applying the gas flow the glass sheet of viscous liquid glass floating on liquid metal is initially equilibrated to being substantially flat on both the upper and the lower surfaces.

6. The method of claim 1, wherein during the applying the gas flow the glass sheet, the liquid metal and gas in the gas flow are all substantially isothermal.

7. The method of claim 1, wherein the glass sheet has a chemical composition of soda-lime float glass, and wherein the gas flow is a flow of a mixture of nitrogen gas with up to 20% hydrogen gas.

8. The method of claim 1, wherein the liquid metal is liquid tin or a tin-based alloy.

9. The method of claim 1, wherein the preselected pattern is an array of convex refractive lenses.

10. The method of claim 1, wherein applying the gas flow is carried out in a continuous process on a production line of a float glass factory.

* * * * *